United States Patent
Sakai et al.

(10) Patent No.: US 10,431,831 B2
(45) Date of Patent: Oct. 1, 2019

(54) CATALYST PARTICLES, CARBON-SUPPORTED CATALYST PARTICLES AND FUEL CELL CATALYSTS, AND METHODS OF MANUFACTURING SUCH CATALYST PARTICLES AND CARBON-SUPPORTED CATALYST PARTICLES

(71) Applicants: Toyota Jidosha Kabushiki Kaisha, Toyota-shi, Aichi-ken (JP); University of Miyazaki, Miyazaki-shi, Miyazaki (JP)

(72) Inventors: Go Sakai, Miyazaki (JP); Tatsuya Arai, Susono (JP); Tetsuya Ogawa, Mishima (JP); Koshi Sekizawa, Susono (JP); Naoki Takehiro, Suntou-gun (JP)

(73) Assignees: Toyota Jidosha Kabushiki Kaisha, Toyota-shi, Aichi-ken (JP); University of Miyazaki, Miyazaki-shi, Miyazaki (JP)

( * ) Notice: Subject to any disclaimer, the term of this patent is extended or adjusted under 35 U.S.C. 154(b) by 0 days.

(21) Appl. No.: 15/486,607

(22) Filed: Apr. 13, 2017

(65) Prior Publication Data
US 2017/0282171 A1 Oct. 5, 2017

Related U.S. Application Data

(62) Division of application No. 13/877,914, filed as application No. PCT/IB2011/002452 on Oct. 6, 2011, now abandoned.

(30) Foreign Application Priority Data
Oct. 8, 2010 (JP) ................................. 2010-228632

(51) Int. Cl.
*H01M 4/92* (2006.01)
*B01J 37/16* (2006.01)
(Continued)

(52) U.S. Cl.
CPC ......... *H01M 4/9041* (2013.01); *B01J 21/063* (2013.01); *B01J 21/18* (2013.01);
(Continued)

(58) Field of Classification Search
None
See application file for complete search history.

(56) References Cited

U.S. PATENT DOCUMENTS 6,492,298 B1 * 12/2002 Sobukawa ......... B01D 53/8628
423/213.5
2002/0071970 A1 * 6/2002 Elder .................. B01J 21/063
428/702
(Continued)

FOREIGN PATENT DOCUMENTS

CN 10153079 A 9/2009
JP 2005-34779 2/2005
(Continued)

OTHER PUBLICATIONS

Machine translation of CN101530797 A dated Sep. 16, 2009.
(Continued)

*Primary Examiner* — Wojciech Haske
(74) *Attorney, Agent, or Firm* — Finnegan, Henderson, Farabow, Garrett & Dunner, LLP

(57) ABSTRACT

A catalyst particle is composed of an inner particle and an outermost layer that includes platinum and covers the inner particle. The inner particle includes on at least a surface thereof a first oxide having an oxygen defect.

6 Claims, 20 Drawing Sheets

(51) Int. Cl.
| | |
|---|---|
| *H01M 4/90* | (2006.01) |
| *B01J 21/06* | (2006.01) |
| *B01J 21/18* | (2006.01) |
| *B01J 23/42* | (2006.01) |
| *B01J 23/62* | (2006.01) |
| *B01J 35/00* | (2006.01) |
| *H01M 4/86* | (2006.01) |
| *H01M 4/88* | (2006.01) |
| *H01M 8/1018* | (2016.01) |

(52) U.S. Cl.
CPC .............. *B01J 23/42* (2013.01); *B01J 23/626* (2013.01); *B01J 35/004* (2013.01); *B01J 35/006* (2013.01); *B01J 37/16* (2013.01); *H01M 4/8657* (2013.01); *H01M 4/88* (2013.01); *H01M 4/9016* (2013.01); *H01M 4/92* (2013.01); *H01M 4/923* (2013.01); *H01M 4/926* (2013.01); *H01M 2008/1095* (2013.01)

(56) References Cited

U.S. PATENT DOCUMENTS

| | | | | |
|---|---|---|---|---|
| 2003/0190475 | A1* | 10/2003 | Carpenter | ............. B82Y 30/00 428/403 |
| 2005/0075240 | A1 | 4/2005 | Yamamoto | |
| 2006/0188775 | A1 | 8/2006 | Mance et al. | |
| 2006/0263675 | A1 | 11/2006 | Adzic et al. | |
| 2009/0068505 | A1 | 3/2009 | Adzic et al. | |
| 2009/0233790 | A1 | 9/2009 | Vajda et al. | |

FOREIGN PATENT DOCUMENTS

| | | |
|---|---|---|
| JP | 2005-50759 | 2/2005 |
| JP | 2005-035900 | 5/2005 |
| JP | 2006-193392 | 7/2006 |
| JP | 2008-100221 | 5/2008 |
| JP | 2008-545604 | 12/2008 |
| WO | WO2006/124959 A2 | 11/2006 |
| WO | WO2006/137579 A1 | 12/2006 |

OTHER PUBLICATIONS

Applicant's Response to Written Opinion of the International Searching Authority in International Application No. PCT/IB2011/002452 (dated Aug. 6, 2012).

Applicant's Response to Written Opinion in International Application No. PCT/IB2011/002452 (dated Nov. 15, 2012).

* cited by examiner

F I G . 16
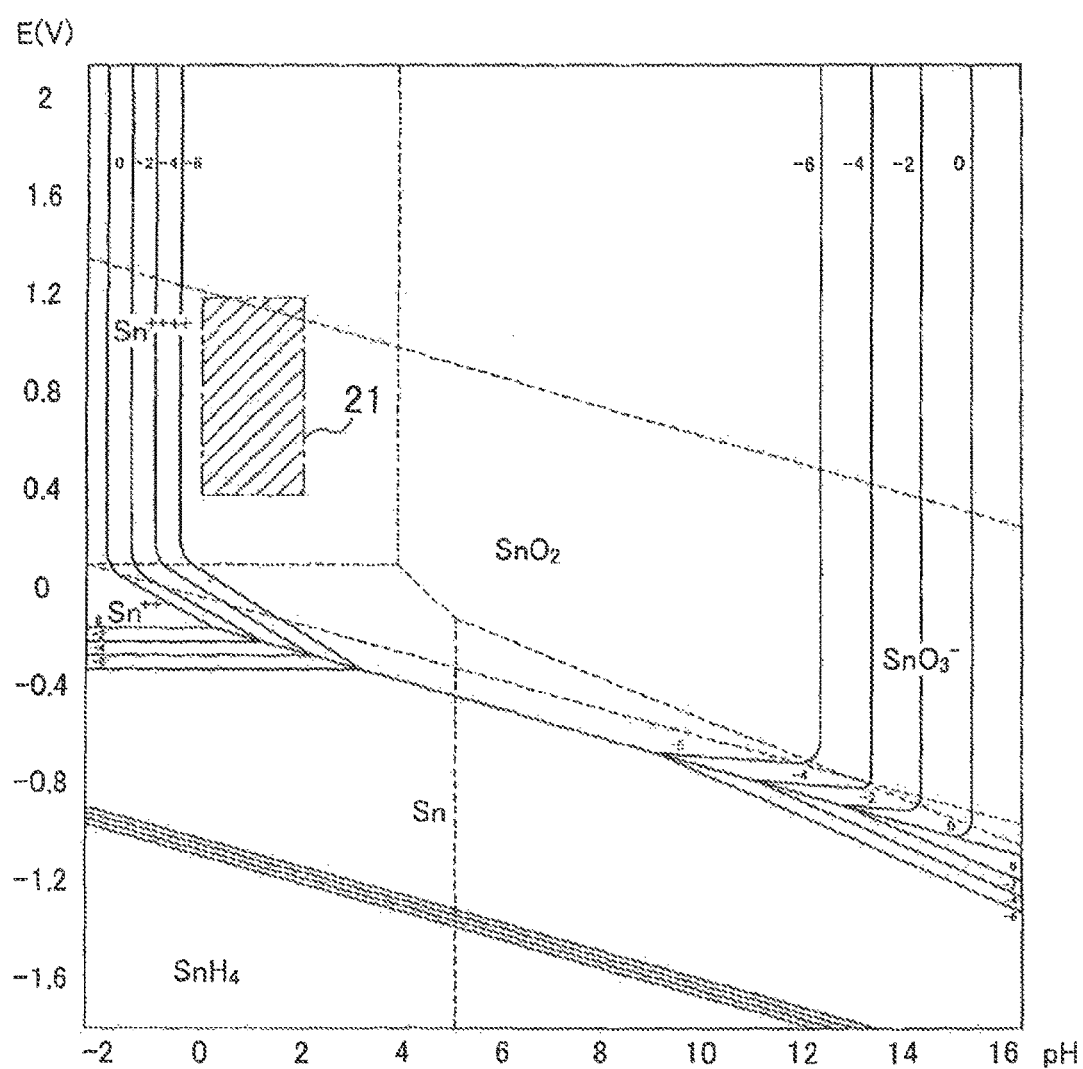

F I G . 20
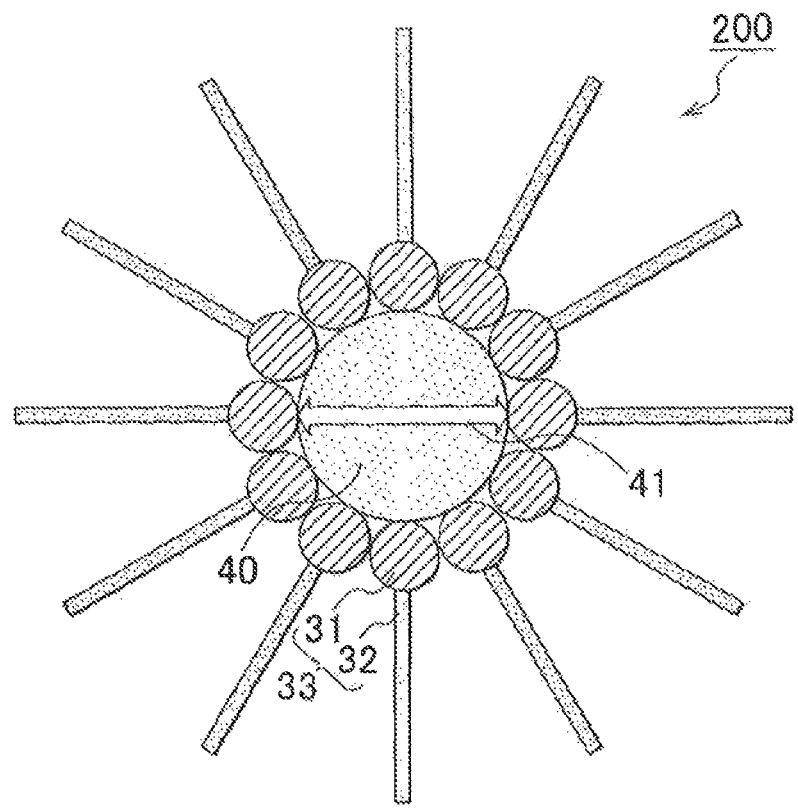
F I G . 21
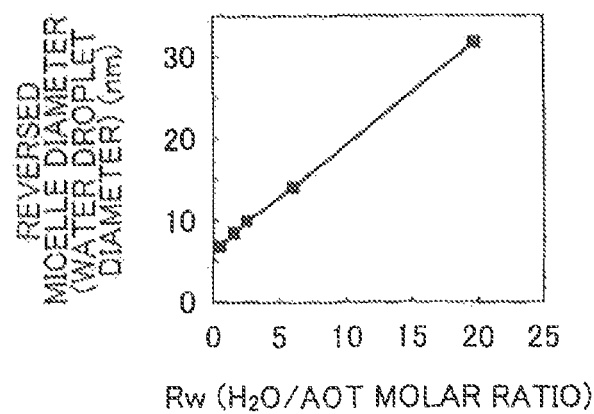

CATALYST PARTICLES, CARBON-SUPPORTED CATALYST PARTICLES AND FUEL CELL CATALYSTS, AND METHODS OF MANUFACTURING SUCH CATALYST PARTICLES AND CARBON-SUPPORTED CATALYST PARTICLES

BACKGROUND OF THE INVENTION

1. Field of the Invention

The invention relates to catalyst particles, carbon-supported catalyst particles and fuel cell catalysts having a high catalytic activity. The invention relates also to methods of manufacturing such catalyst particles and such carbon-supported catalyst particles.

2. Description of Related Art

A fuel cell supplies a fuel and an oxidant to two electrically connected electrodes and, by inducing electrochemical oxidation of the fuel, converts chemical energy directly into electrical energy. Unlike thermal power generation, fuel cells do not incur the limitations of the Carnot cycle, and thus exhibit a high energy conversion efficiency. A fuel cell is generally composed of a plurality of stacked unit cells, the basic construction in each unit cell being a membrane electrode assembly made up of an electrolyte membrane sandwiched between a pair of electrodes.

Supported platinum and platinum alloy materials are employed as anode and cathode electrocatalysts in fuel cells. However, platinum in the amounts required in electrocatalysts according to the latest current technology remains expensive for commercially realizing the mass production of fuel cells. Accordingly, research has been conducted which aims to reduce the amount of platinum included in fuel cell cathodes and anodes by combining platinum with less expensive metals.

In fuel cells, a decrease in voltage due to an overpotential is one major cause of decreased output. Examples of overpotentials include activation overpotentials due to electrode reactions, resistance overpotentials due to resistance at the electrode surface and in the cell overall, and concentration overpotentials due to the distribution in the reactant concentration at the electrode surface. Of these three types of overpotentials, electrocatalysts are effective in lowering activation overpotentials. Because platinum has a high catalytic performance, platinum and platinum alloys are advantageous for use as the electrocatalysts in the fuel cell cathode and anode. In particular, given the efforts that are being made to utilize solid polymer electrolyte-type fuel cells as automotive and stationary power supplies, there has existed a desire to maintain a high durability and the desired power generating performance over an extended period of time in electrocatalysts as well. Japanese Patent Application Publication No. 2005-135900 (JP-A-2005-135900) discloses, as a catalyst aimed at maintaining a power generating performance over an extended period of time, a fuel cell electrocatalyst of precious metal-containing particles supported on an electrically conductive support, wherein the precious metal-containing particles have a core-shell structure with a core composed of a precious metal alloy and a shell which has been formed on the outer periphery of the core and is composed of a precious metal-containing layer having a different composition than the core.

Paragraph [0020] in JP-A-2005-135900 mentions that the core contains precious metals such as platinum, palladium and rhodium. With catalysts that use precious metals in the core in this way, achieving radical reductions in cost is difficult. Also, paragraph [0041] in JP-A-2005-135900 refers to, when a shell having a differing composition than the core is formed in catalyst particles having a core, dissolving ingredients other than precious metals by having aqua regia, nitric acid, concentrated sulfuric acid or the like act on the catalyst particles. However, acid treatment is very difficult to control, in addition to which there are such drawbacks as hydrophilization and oxidation of the carbon support, the loss of metal which dissolves due to the acid, the inability to control the catalyst particle size, and an increase in unnecessary steps due to acid treatment.

SUMMARY OF THE INVENTION

The invention provides catalyst particles, carbon-supported catalyst particles and fuel cell catalysts having a high catalytic activity. The invention provides also methods of manufacturing such catalyst particles and such carbon-supported catalyst particles.

The catalyst particle of the invention is a catalyst particle having an inner particle and having also an outermost layer which contains platinum and covers the inner particle. The inner particle contains on at least a surface thereof a first oxide having oxygen defects.

In the inventive catalyst particle, the inner particle may have a center particle and an intermediate layer covering the center particle, which center particle may contain a second oxide which is free of oxygen defects and includes an element common with an element other than oxygen included in the first oxide, and which intermediate layer may contain the first oxide.

In the inventive catalyst particle, the first oxide may include an element selected from the group consisting of titanium, tin, tantalum, niobium and silicon.

The foregoing catalyst particle may be supported on a carbon support.

In the carbon-supported catalyst particle of the invention, the carbon support may be a support composed of at least one carbon material selected from the group consisting of acetylene black, furnace black, carbon black, activated carbon, mesophase carbon and graphite.

The fuel cell catalyst of the invention may include the foregoing carbon-supported catalyst particles.

The inventive method of manufacturing catalyst particles is a method of manufacturing catalyst particles having an inner particle and an outermost layer which contains platinum and covers the inner particle. The method includes the step of preparing a dispersion of particles composed of a second oxide which is free of oxygen defects; the step of preparing a dispersion of platinum ions; a reducing step in which, at least, the dispersion of particles composed of the second oxide and the dispersion of platinum ions are mixed together, at least the surfaces of the particles composed of the second oxide are reduced to a first oxide having oxygen defects and an outermost layer containing platinum formed by reduction of the platinum ions is formed on the first oxide; and the step of heating the mixture after the reducing step.

In the inventive method of manufacturing catalyst particles, an intermediate layer containing the first oxide may be formed at the surfaces of the particles composed of the second oxide, and the outermost layer may be formed over the intermediate layer.

The inventive method of manufacturing catalyst particles may also include a preliminary reducing step wherein, prior to the above reducing step, the dispersion of particles composed of the second oxide is pre-reduced at least the particles composed of the second oxide.

In the inventive method of manufacturing catalyst particles, the dispersion of particles composed of the second oxide may be a dispersion of reversed micelles containing particles composed of the second oxide, the dispersion of platinum ions may be a dispersion of reversed micelles containing platinum ions, when at least the particles composed of the second oxide are pre-reduced, a reducing agent may be additionally mixed into the mixture of the dispersion of reversed micelles containing particles composed of the second oxide with the dispersion of reversed micelles containing platinum ions, and the heating step may be carried out after adding an alcohol to the mixture following the reducing step.

In the inventive method of manufacturing catalyst particles, the dispersion of reversed micelles containing particles composed of the second oxide may be obtained by mixing an aqueous solution or aqueous dispersion of particles composed of the second oxide with an organic solvent solution in the presence of a surfactant. The dispersion of reversed micelles containing platinum ions may be obtained by mixing an aqueous solution of the platinum ions with an organic solvent solution in the presence of a surfactant.

In the inventive method of manufacturing catalyst particles, the second oxide may be an oxide selected from the group consisting of titanium (IV) oxide ($TiO_2$), tin (IV) oxide ($SnO_2$), tantalum (V) oxide ($Ta_2O_5$), niobium (V) oxide ($Nb_2O_5$) and silicon dioxide ($SiO_2$).

In the inventive method of manufacturing catalyst particles, the second oxide may have a photocatalytic activity, a sacrificial reagent additionally may be mixed into the mixture of the dispersion of particles composed of the second oxide with the dispersion of platinum ions, then the mixture may be irradiated with light.

In the inventive method of manufacturing catalyst particles, the dispersion of particles composed of the second oxide may be a dispersion of reversed micelles containing particles composed of the second oxide, the dispersion of platinum ions may be a dispersion of reversed micelles containing platinum ions, and the heating step may be carried out after adding an alcohol to the light-irradiated mixture.

In the inventive method of manufacturing catalyst particles, the dispersion of reversed micelles containing particles composed of the second oxide may be obtained by mixing together an aqueous solution or aqueous dispersion of particles composed of the second oxide with an organic solvent solution in the presence of a surfactant. Moreover, the dispersion of reversed micelles containing platinum ions may be obtained by mixing together the aqueous solution of platinum ions with an organic solvent solution in the presence of a surfactant.

In the inventive method of manufacturing catalyst particles, the second oxide having a photocatalytic activity may a metal oxide selected from the group consisting of titanium (IV) oxide ($TiO_2$) and tin (IV) oxide ($SnO_2$).

A first inventive method of manufacturing carbon-supported catalyst particles is a method of manufacturing carbon-supported catalyst particles composed of catalyst particles that are obtained by the above manufacturing method and have been supported on a carbon support. In the reducing step using a reducing agent, the carbon support is admixed, either before additionally mixing the reducing agent into a mixture of the dispersion of reversed micelles containing particles composed of the second oxide with the dispersion of reversed micelles containing platinum ion or after additionally mixing the reducing agent into the mixture.

A second inventive method of manufacturing carbon-supported catalyst particles is a method of manufacturing carbon-supported catalyst particles composed of catalyst particles that are obtained by the above manufacturing method and have been supported on a carbon support. In the reducing step using a light-irradiation, a sacrificial reagent is additionally mixed into a mixture of the dispersion of particles composed of the second oxide with the dispersion of platinum ions and the mixture is irradiated with light, then a carbon support is additionally mixed into the light-irradiated mixture.

In the first and second methods of manufacturing carbon-supported catalyst particles of the invention, the carbon support may be a support composed of at least one carbon material selected from the group consisting of acetylene black, furnace black, carbon black, activated carbon, mesophase carbon and graphite.

The invention, as a result of the oxygen defects in the first oxide within the inner particle bonding with the platinum within the outermost layer, as a result of platinum being situated at the oxygen defects, or as a result of platinum being situated as the nearest neighbor atom to the oxygen defect, is able to achieve a higher catalyst activity and a better durability even than those of platinum catalyst particles and catalysts having a core-shell structure which use a precious metal in the core. Moreover, the manufacturing methods of the invention are able to provide catalyst particles more inexpensively than when catalyst having a core-shell structure in which a precious metal is used in the core is manufactured. Finally, the inventive manufacturing methods are able, in a reducing step, to simultaneously induce both the formation of oxygen defects on at least the surfaces of particles composed of a second oxide that serve as the inner particles and also reduction of the platinum.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a potential/pH diagram for a tin-water system at 25° C.;

FIG. 20 is a cross-sectional schematic drawing of a reversed micelle;

FIG. 21 is a graph showing the relationship between Rw and the diameter of the reversed micelles when decane was used as the organic phase.

DETAILED DESCRIPTION OF EMBODIMENTS

1. Catalyst Particle

Figure 1A:
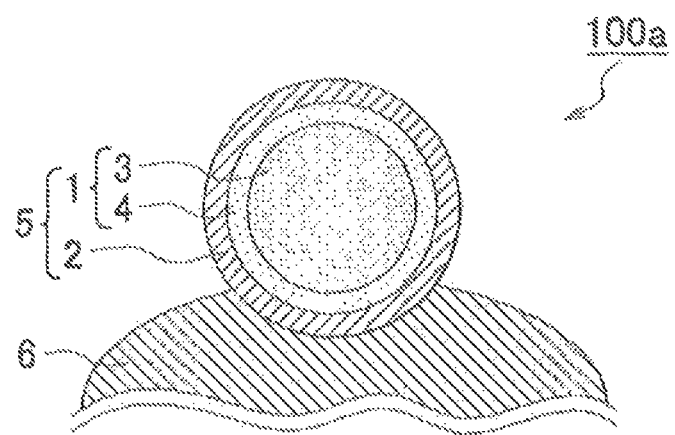
FIGS. 1A and 1B are respectively schematic cross-sectional views of typical first and second examples of the carbon-supported catalyst particle of the invention.

For reasons having to do with cost and available natural resources, core-shell structured catalysts which use platinum in the shell and a metal other than platinum in the core have been proposed as electrocatalysts for fuel cells. However, when a metal which is baser than platinum is used in the core, the core metal dissolves in the fuel cell operating condition, leading to declines in both the catalyst performance and durability. On the other hand, when a metal which is more noble than platinum is used, stability is achieved, but because the amount of precious metal cannot be reduced, costs are not curtailed. The inventors have succeeded both in developing, as a catalyst endowed with an excellent performance and durability and capable of reducing the amount of precious metal used, a catalyst particle wherein a stable oxide is used as an inner particle, and also in developing a method of manufacturing such catalyst particles. The inner particle, outermost layer and other features of the catalyst particle according to this embodiment of the invention are described below in this order.

1-1. Internal Particle

The inner particle used in this embodiment contains, on at least the surface of the particle, a first oxide having oxygen defects. As used herein, "oxygen defects" refers to, in a chemical structure of oxygen atoms connected to atoms other than oxygen atoms within an oxide, areas where some of the oxygen atoms are missing and the chemical structure is interrupted. The oxidation sates (valences) of atoms other than oxygen atoms in the vicinity of oxygen defects is often lower than the oxidation state of such atoms in areas farther from the oxygen defects. It is preferable that the first oxide not readily dissolve in the normal operating condition of a fuel cell.

The inner particle may be a particle which includes the first oxide on the surface, or may be a particle composed solely of the first oxide. Of these, because the inner particle is able to maintain a particulate shape, it is preferable for the first oxide to be included on the surface of the inner particle. In one embodiment where the first oxide is included on the surface of the inner particle, the inner particle has a center particle and an intermediate layer covering the center particle, which intermediate layer contains the first oxide.

A catalyst particle wherein the inner particle has a two-layer structure composed of a center particle and an intermediate layer, by using in the intermediate layer a first oxide having oxygen defects, has the advantage that the outermost layer containing platinum can be formed as a continuous layer over the intermediate layer. By using such an oxide, increases in the catalytic activity and durability of the catalyst particle can be achieved.

In catalyst particles wherein the inner particle has a two-layer structure composed of a center particle and an intermediate layer, the center particle may contain a second oxide which is free of oxygen defects and includes an element common with an element other than oxygen included in the first oxide. FIGS. 15 to 19 are potential/pH diagrams (Pourbaix diagrams) for, respectively, titanium-water systems, tin-water systems, tantalum-water system, niobium-water systems and silicon-water systems at 25° C. In FIGS. 15 to 19, the range which satisfies the potential/pH conditions (potential=0.4 to 1.2 V; pH=0 to 2) in the normal operating condition for a fuel cell is indicated by the hatched box 21. According to FIG. 15, under the conditions within this box 21, titanium exists in the state of titanium (IV) oxide ($TiO_2$). Therefore, in cases where a center particle containing $TiO_2$ has been used, there is no risk of the center particle dissolving in the normal operating condition of a fuel cell. According to FIGS. 16 to 19, when center particles containing tin (IV) oxide ($SnO_2$), tantalum (V) oxide ($Ta_2O_5$), niobium (V) oxide ($Nb_2O_5$) or silicon dioxide ($SiO_2$) are used, there is no risk of the center particles dissolving in the normal operating condition of a fuel cell. From the above, the second oxide included in the center particle preferably contains titanium, tin, tantalum, niobium or silicon. Moreover, the second oxide is preferably $TiO_2$, $SnO_2$, $Ta_2O_5$, $Nb_2O_5$ or $SiO_2$. Likewise, the first oxide preferably contains titanium, tin, tantalum, niobium or silicon. Moreover, the first oxide is preferably $TiO_p$ (wherein p is a real number such than $0<p<2$), $SnO_q$ (wherein q is a real number such than $0<q<2$), $Ta_2O_r$ (wherein r is a real number such than $0<r<5$), $Nb_2O_s$ (wherein s is a real number such than $0<s<5$), or $SiO_t$ (wherein t is a real number such than $0<t<2$).

Of the above second oxides, $TiO_2$, $SnO_2$, $Ta_2O_5$ and $Nb_2O_5$ are compounds which are more ionic than $SiO_2$. Therefore, $TiO_2$, $SnO_2$, $Ta_2O_5$ and $Nb_2O_5$ generate ionic oxygen defects at the respective crystal surfaces and crystal interiors. By having the catalyst platinum arranged as the outermost layer situated at the generated oxygen defects, a high catalytic ability can be manifested. Hence, the second oxide included in the center particle more preferably includes titanium, tin, tantalum or niobium. The second oxide is more preferably $TiO_2$, $SnO_2$, $Ta_2O_5$ or $Nb_2O_5$. Similarly, the first oxide more preferably includes titanium, tin, tantalum or niobium. The first oxide is preferably $TiO_p$, $SnO_q$, $Ta_2O_r$ or $Nb_2O_s$ (p, q, r and s being the same real numbers as indicated above).

$TiO_2$, $SnO_2$, $Ta_2O_5$ and $Nb_2O_5$ are substantially the same from the standpoint of stability. However, from the standpoints of catalytic activity, the ease of electron donation to the catalyst element situated at the oxygen defects and cost, $TiO_2$ and $SnO_2$ are even more preferable than $Ta_2O_5$ or $Nb_2O_5$. In addition, from the standpoint that stable supply has become possible because reserves, production output and methods of preparing metal oxide particle dispersion systems (oxide sols) have been established, $TiO_2$ and $SnO_2$ are even more preferred. In light of the above, it is more preferable for the second oxide contained in the center particle to include titanium or tin, and it is more preferable for the second oxide to be $TiO_2$ or $SnO_2$. Similarly, it is more preferable for the first oxide to include titanium or tin, and it is more preferable for the first oxide to be $TiO_p$ or $SnO_q$ (wherein p and q are the same real numbers as indicated above). In particular, selecting a $TiO_2$ particle as the center particle is far more advantageous from the standpoint of cost than selecting a palladium particle as the center particle (cost of palladium: ¥700 to 1,000/g; cost of $TiO_2$: ¥100/kg).

In order to form a platinum-containing layer as a continuous layer over the intermediate layer, it is essential for bonds between the platinum and the metal or non-metal M to be more stable than platinum-platinum bonds and M-M bonds. A case in which platinum was three-dimensionally grown on a $TiO_2$ (110) plane has been described as an example of platinum layer formation on an oxide (U. Diebold et al.: *Surf. Sci.*, 331, 845-854 (1995)). However, the bond between platinum and titanium itself is not necessarily strong.

The inventors have discovered that, by removing some oxygen from the surface of the oxide particle, stronger interactions arise between the platinum and the metal or non-metal M, making it possible to fix the platinum to the surface of the oxide particle. Specifically, they have found that, by forming an intermediate layer having oxygen defects at the surface of the oxide particles, it is possible to form a platinum-containing layer as a continuous layer on the intermediate layer. The fact that the intermediate layer which has formed contains oxygen defects will be discussed in detail in the subsequently described examples. In addition, as is shown in the subsequently described examples of the invention, a layer containing platinum which is bonded to oxygen defects in this way has a high activity and durability compared with conventional platinum catalyst particles.

From the standpoint of efficiently carrying out formation of the subsequently described outermost layer, it is preferable for the intermediate layer to have a coverage with respect to the center particle of from 25 to 100%. Were the coverage of the intermediate layer with respect to the center particle to be less than 25%, formation of the subsequently described outermost layer would not fully proceed. In a catalyst particle which uses an oxide in the center particle as in the embodiment, so long as the electrical conductivity is good, even when the intermediate layer coverage with respect to the center particle is low, there is no adverse influence on the durability of the overall catalyst particle. Therefore, the tradeoff of having the coverage be low is merely that, when the catalyst particles of this embodiment are included in the catalyst layer of a fuel cell, the thickness of the catalyst layer will become larger. As for the outermost layer, because, in principle, this only covers the intermediate layer, i.e., the first oxide, the coverage of the intermediate layer with respect to the center particle becomes the coverage of the outermost layer with respect to the inner particle (sometimes referred to below as the "final coverage"). On the other hand, the optimal thickness of a fuel cell catalyst layer in membrane electrode assembly is from 1 to 20 μm. The thickness of the catalyst layer varies according to the final coverage and the average particle size of the catalyst particles. Given that the optimal average particle size of the catalyst particle according to this embodiment is from 3 to 10 nm, it is preferable, for example, that the final coverage in catalyst particles having an average particle size of 10 nm be at least 90%, that the final coverage in catalyst particles having an average particle size of 5 nm be at least 45%, and that the final coverage in catalyst particles having an average particle size of 3 nm be at least 25%.

1-2. Outermost Layer

The outermost layer of the catalyst particle of this embodiment is a layer which contains platinum and covers the inner particle described above. The outermost layer is preferably made of platinum alone or an alloy of platinum with a metal material selected from the group consisting of iridium, ruthenium, rhodium and gold. In cases where a platinum alloy is used in the outermost layer, letting the overall weight of the alloy be 100 wt %, it is preferable for the platinum content to be at least 80 wt % but less than 100 wt %. At a platinum content less than 80 wt %, a sufficient catalytic activity and durability cannot be obtained. The outermost layer exhibits the highest specific activity when $Pt_4Ir$ is used.

From the standpoint of being able to better inhibit dissolving of the internal particle, it is preferable for the coverage of the outermost layer with respect to the inner particle to be from 70 to 100%. Were the outermost layer coverage with respect to the inner particle to be less than 70%, a sufficiently high catalytic activity may not be achieved.

As used herein, "outermost layer coverage with respect to inner particle" refers to the proportion of the surface area of the inner particle which is covered by the outermost layer, based on a value of 100% for the entire surface of the inner particle. One method for determining this coverage involves using transmission electron microscopy (TEM) to examine several places on the surface of a catalyst particle, and calculating the proportion of the surface area of the inner particle that can be confirmed by such examination to be covered by the outermost layer. The outermost layer coverage with respect to the inner particle can also be calculated by using, for example, X-ray photoelectron spectroscopy (XPS) or time-of-flight secondary ion mass spectrometry (TOF-SIMS) to identify the ingredients present at the surfacemost portion of the catalyst particle.

With regard to thickness, the outermost layer is preferably a layer of at least one atom but not more than three atoms. As shown in the subsequently described working examples, compared with catalyst particles having an outermost layer of four or more atoms, catalyst particles having an outermost layer of at least one atom but not more than three atoms have both the advantage of a high surface area per gram of platinum and also the advantage of low material costs owing to the small amount of covering platinum. To ensure the largest possible catalyst surface area and to enable the largest possible number of the covering platinum atoms to effectively exhibit a catalytic ability, with none of the platinum atoms being isolated from the standpoint of electron conductivity, it is preferable for the outermost layer to be a continuous layer. In order to thus ensure stability and catalyst activity, it is preferable for the outermost layer to be a continuous layer and to be a layer of three or fewer atoms. However, it is not necessarily essential for the outermost layer to cover the entire surface of the inner particle. Exposed portions of the surface of the inner particle that are not covered by an outermost layer which exhibits a catalytic function may instead be covered by another stable element.

1-3. Other Features

The average particle size of the catalyst particle according to this embodiment is preferably from 2 to 20 nm, and more preferably from 3 to 10 nm. Because the outermost layer of the catalyst particle is preferably, as described above, a layer of three or fewer atoms, the outermost layer has a thickness of preferably from 0.17 to 0.69 nm. Hence, the thickness of the outermost layer relative to the average particle size of the catalyst particles is substantially negligible, the average size of the inner particle and the average size of the catalyst particle being substantially equal. The average size of the particles in this embodiment is calculated by an ordinary method. An example of a method for calculating the average size of the particles is described. First, for a single given particle in a TEM image at an enlargement of 400,000× or 1,000,000×, the particle diameter assuming the particle to be spherical is calculated. Calculation of the average particle diameter by such TEM observation is carried out for 200 to 300 particles of the same type, and the average for these particles is treated as the average particle size.

2. Carbon-Supported Catalyst Particle

In the carbon-supported catalyst particle of this embodiment, the above-described catalyst particle is supported on a carbon support.

Electrically conductive supports for supporting the catalyst particles are not subject to any particular limitation, provided they have a specific surface area sufficient for supporting the catalyst particles in a highly dispersed manner and have a sufficient conductivity for use as a current collector. Having the main ingredient be carbon is preferable because a sufficiently high conductivity can be obtained and the electrical resistance is low. If the conductive support has a high electrical resistance, the internal resistance of the catalyst-supporting electrode becomes high, leading a decrease in fuel cell performance. Illustrative examples of conductive supports include carbon materials such as acetylene black, furnace black, carbon black, activated carbon, mesophase carbon, graphite, channel black and thermal black; activated carbon obtained by carbonizing and activation treating various carbon atom-containing materials; graphitized carbon and other materials containing carbon as the main ingredient, carbon fibers, porous carbon particles, carbon nanotubes, and porous carbon bodies. The Brunauer-Emmett-Teller theory (BET) specific surface area is preferably from 100 to 2,000 $m^2/g$, and more preferably from 200 to 1,600 $m^2/g$. Within this range, the catalyst particles can be supported in a highly dispersed manner. It is especially preferable to use as the carbon material a carbon material such as acetylene black, furnace black, carbon black, activated carbon, mesophase carbon or graphite. Because supports containing these carbon materials are able to support catalyst particles in a highly dispersed manner, an electrode catalyst having a high activity can be obtained. Also, it is possible to take into account dispersion in an organic phase or an aqueous phase, and control the hydrophilicity and hydrophobicity of the surface of the support used or of the support itself.

With regard to the platinum-supporting carbon ordinarily used in fuel cells, based on cost considerations, it is not possible to use platinum particles which have a high specific activity and durability and a large average particle size. The reason is that, because increasing the average particle size decreases the surface area per gram of platinum, even more platinum is needed to attain the required platinum surface area. In a core-shell structured catalysts that uses a precious metal such as palladium in core matterial, because the platinum accounts for only a surfacemost layer of one to three atoms, the surface area per gram of platinum is large. However, the cost of the precious metal at the interior (core material in core-shell structure) must also be taken into account; hence, as with platinum particles, increasing the average particle size has its limitations. In the case of core-shell particles which use a palladium core, an average particle size of about 6 nm is preferred from the standpoint of cost; at an average particle size of 10 nm which provides a sufficient durability, the potential of the core-shell structure cannot be fully achieved.

By contrast, in the catalyst particle of this embodiment, the oxide used in the inner particle has a cost which is not more than one one-thousandth the cost of a precious metal, and thus is extremely inexpensive. Therefore, unlike core-shell particles in which a precious metal is used in the core, it is possible in principle for the catalyst particle of the embodiment to exhibit the full potential of a core-shell structure even at an average particle size of 10 nm or more. The average particle size of the carbon-supported catalyst particle of this embodiment is determined by the average particle size of the carbon support. The carbon-supported catalyst particle of this embodiment is described here for a case in which use in the catalyst layer of a fuel cell is assumed. The average particle size of practical support carbons for fuel cells (e.g., Ketjen EC, Vulcan XC-72) is at most about 30 nm. The maximum average particle size of catalyst particles which can be supported on such support carbon is about 10 nm, and the number of catalyst particles that can be supported is two. With carbon particles having an average particle size of more than 30 nm, the average particle size of catalysts can be made even larger, but there is a tradeoff in terms of the thickness of the catalyst layer in membrane electrode assembly of fuel cell.

Figure 1B:
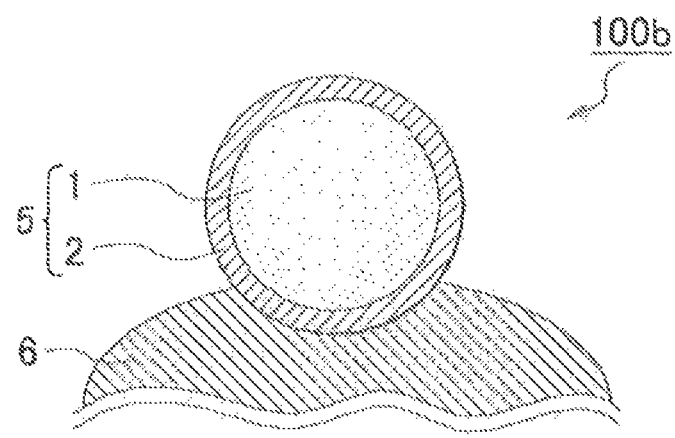

FIGS. 1A and 1B are cross-sectional drawings which schematically show first and second typical examples of carbon-supported catalyst particles according to the embodiment. The double wavy lines signify an omission in the drawings. The thicknesses of the intermediate layer and the outermost layer drawn in FIGS. 1A and 1B do not necessary reflect the actual layer thicknesses. FIG. 1A is a schematic cross-sectional drawing showing a first typical example of a carbon-supported catalyst particle according to the embodiment. The carbon-supported catalyst particle 100a in this example is composed of a catalyst particle 5 and a carbon support 6, which catalyst particle 5 is composed of an inner particle 1 and an outermost layer 2 covering the inner particle 1. In this example, the inner particle 1 is further composed of a center particle 3 and an intermediate layer 4 covering the center particle 3. The intermediate layer 4 includes a first oxide having a chemical composition with a lower proportion of oxygen atoms than the chemical composition of the second oxide making up the center particle 3. FIG. 1B is a schematic cross-sectional drawing showing a second typical example of a carbon-supported catalyst particle according to the embodiment. The carbon-supported catalyst particle 100b in this example, like the above-described carbon-supported catalyst particle 100a, is composed of a catalyst particle 5 and a carbon support 6, which catalyst particle 5 is in turn composed of an inner particle 1 and an outermost layer 2 covering the inner particle 1. However, in this example, the inner particle 1 is composed solely of a first oxide having oxygen defects.

3. Fuel Cell Catalyst

The fuel cell catalyst of this embodiment includes the above-described carbon-supported catalyst particle. There is an optimal thickness for the catalyst layer in the membrane electrode assembly used in a fuel cell; a catalyst layer that is too thin or too thick is inappropriate. A catalyst layer thickness of from 1 to 100 μm is generally preferred, and a thickness of about 10 μm is optimal. Here, the catalyst layer thickness is determined by the carbon support used, the average size and weight of the catalyst particles, and the weight of ionomer. What this indicates is that, when trying to ensure a platinum surface with avoiding being an oxygen diffusion-limiting step, the catalyst layer will end up being thick with a combination of catalyst partices and carbon particles having large average particle sizes, making use as a membrane electrode assembly for a fuel cell difficult. In this embodiment, as described above, in supporting the catalyst, it is necessary to select a support carbon having an average particle size suitable for the average particle size of the catalyst particles and to take the thickness of the catalyst layer into account. For example, in cases where the catalyst layer thickness is set to 10 μm, N/C=0.75 (ratio of ionomer weight to carbon weight), the platinum coverage is 90%, and the platinum outermost layer has a two-atom thickness, the upper limit in the average particle size of the catalyst particle in this embodiment will be 10 nm. In cases where the catalyst particle is composed of a platinum outermost layer and a $TiO_2$ inner particle, the carbon loading is 32 wt %. This carbon loading X is calculated as X=(platinum weight+$TiO_2$ weight)/(platinum weight+$TiO_2$ weight+carbon weight)×100.

4. Method of Manufacturing Catalyst Particles

The method of manufacturing catalyst particles according to this embodiment includes the step of preparing a dispersion of particles composed of a second oxide which is free of oxygen defects; the step of preparing a dispersion of platinum ions; a reducing step wherein, at least, the dispersion of particles composed of the second oxide and the dispersion of platinum ions are mixed together, at least the surfaces of the particles composed of the second oxide are reduced to a first oxide having oxygen defects, and an outermost layer containing platinum formed by reduction of the platinum ions is formed on the first oxide; and the step of heating the mixture after the reducing step.

The manufacturing method of this embodiment is able to reduce the amount of precious metal used even more than when catalyst having a core-shell structure which uses a precious metal in the core is employed, and can thus inexpensively provide catalyst particles. Moreover, because a continuous outermost layer containing platinum can be formed, unlike when producing a catalyst having a core-shell structure in which a base metal is used in the core, there is no risk of dissolving of the inner particle, thus enabling catalyst particles having an excellent catalyst performance and durability to be provided. In addition, in the subsequently described reducing step which uses, for example, reversed micelles or a photoreduction method, the formation of oxygen defects on at least the surface of the particle composed of a second oxide which serves as the inner particle and the reduction of the platinum can be made to proceed at the same time, enabling formation of the outermost layer to proceed reliably.

The manufacturing method of this embodiment includes (1) the step of preparing a dispersion of particles composed of a second oxide, (2) the step of preparing a dispersion of platinum ions, (3) a reducing step, and (4) a heating step. However, the manufacturing method of this invention is not necessarily limited only to the above four steps; in addition to these four steps, the manufacturing method may also include, for example, the subsequently described filtration and washing step, drying step and grinding step. Above steps (1) to (4) and such other steps are described below in order.

4-1. The Step of Preparing a Dispersion of Particles Composed of a Second Oxide

In this step a dispersion of particles composed of a second oxide which is free of oxygen defects is prepared. The second oxide is the same as the second oxide described above in Section 1-1.

The particles composed of a second oxide may be crystalline particles or amorphous particles. However, when the subsequently described photoreduction method is used, it is desirable to select the degree of crystallization of the second oxide according to the reaction conditions, and so it is preferable for the particles composed of the second oxide to be amorphous particles. Even in cases where crystalline particles are used, particularly in the case of $TiO_2$ particles, anatase-type crystal particles are more preferred, although rutile-type or brookite-type crystal particles are also acceptable. When the subsequently described reversed micelles are used, the second oxide is preferably titanium (IV) oxide ($TiO_2$), tin (IV) oxide ($SnO_2$), tantalum (V) oxide ($Ta_2O_5$) or niobium (V) oxide ($Nb_2O_5$). When the subsequently described photoreduction method is used, from the standpoint of having a photocatalytic activity, the second oxide is preferably titanium (IV) oxide ($TiO_2$) or tin (IV) oxide ($SnO_2$).

The dispersion of particles composed of the second oxide, so long as it is a liquid in which the second oxide is uniformly dispersed, is not subject to any particular limitation, and may even be a solution. However, in cases where the particles are dispersed using the subsequently described reversed micelles, a dispersion of reversed micelles containing particles composed of the second oxide or a dispersion of reversed micelles containing target ions for obtaining a target oxide within the reversed micelles is used. The dispersion medium is not subject to any particular limitation, provided it uniformly disperses the second oxide. Because handling is easy, the use of water as the dispersion medium is preferred. When dispersion is effected using the subsequently described reversed micelles, pure water is used as the aqueous phase, and an organic solvent such as octane, nonane, decane or cyclohexane is used as the organic phase.

Details of the dispersion are explained below for cases in which $TiO_2$ is used as the second oxide. A dispersion of amorphous particles of $TiO_2$ can be obtained by the alkali hydrolysis, or hydrolyzing treatment, of a titanium salt such as titanium chloride ($TiCl_4$) or an alkoxide such as titanium propoxide ($Ti(OC_3H_8)_4$) using sodium hydroxide (NaOH) or tetramethylammonium hydroxide (($CH_3$)$_4$NOH:TMAH). A dispersion of crystalline particles of $TiO_2$ can be obtained by adding, if necessary, a dispersion medium such as water to, for example, crystalline particles of $TiO_2$ synthesized by a conventional method or to a commercial crystalline $TiO_2$ sol (available under the trade name Tynoc M-6 from Taki Chemical Co., Ltd.). Dispersion of reversed micelles containing $TiO_2$ will be described in greater detail in connection with the subsequently described reduction using reversed micelles.

4-2. Step of Preparing a Dispersion of Platinum Ions

The dispersion of platinum ions prepared in this step is not subject to any particular limitation, provided it is a liquid in which platinum ions are uniformly dispersed. However, in cases where dispersion is effected using the subsequently described reversed micelles, a dispersion of reversed micelles containing platinum ions is used. The dispersion medium is not subject to any particular limitation, provided it uniformly disperses platinum ions. Because handling is easy, the use of water as the dispersion medium is preferred. When dispersion is effected using the subsequently described reversed micelles, pure water is used as the aqueous phase, and an organic solvent such as octane, nonane, decane or cyclohexane is used as the organic phase.

Of platinum ion dispersions, an aqueous solution of platinum ions can be obtained by, if necessary, diluting a platinum salt such as hexachloroplatinic acid ($H_2PtCl_6 \cdot 6H_2O$) with water. A dispersion of reversed micelles containing platinum ions will be described in greater detail in connection with the subsequently described reduction using reversed micelles.

4-3. Reducing Step

This step is a reducing step in which, at least, the dispersion of particles composed of the second oxide and the dispersion of platinum ions are mixed together, at least the surfaces of the particles composed of the second oxide are reduced to a first oxide having oxygen defects, and an outermost layer containing platinum formed by reduction of the platinum ions is formed on the first oxide. The first oxide is the same as the first oxide mentioned above in Section 1-1.

In this step, the surfaces of the particles composed of the second oxide may be reduced to the first oxide having oxygen defects, or the entire particles composed of the second oxide may be converted to particles composed solely of the first oxide. Of these possibilities, reduction of the surface of the particles composed of the second oxide to the first oxide is exemplified by a case in which an intermediate layer containing the first oxide is formed on the surfaces of the particles composed of the second oxide. In this case, an outermost layer is formed on the intermediate layer.

Typical examples of reduction methods which may employed in this step include chemical reduction using a reaction reagent which exhibits reducing properties, and a reduction method which uses a photoreaction. Hereinafer, these reduction examples are explained.

4-3-1 Reactions which Exhibit a Reducing Ability in the Reversed Micelle Method

In chemical reduction using a reaction reagent which exhibits a reducing ability in a reversed micelle method that employs a reagent, use is made of the above-described dispersion of reversed micelles containing particles composed of the second oxide and dispersion of reversed micelles containing platinum ions. "Reversed micelle" refers to an association created by an oil-soluble surfactant which, in an oil such as a hydrocarbon, arranges the hydrophilic groups on the inside and the lipophilic groups on the outside. By employing water enclosed within a reversed micelle as the field of nano-reactions, the formation of oxygen defects on at least the surface of the particles composed of the second oxide, the reduction of platinum ions, and the bonding of platinum with oxygen defects can all be carried out at the same time.

The dispersion of reversed micelles containing particles composed of the second oxide may be obtained by, for example, mixing together particles composed of the second oxide and a surfactant. Likewise, the dispersion of reversed micelles containing platinum ions may be obtained by mixing together platinum ions and a surfactant. The reversed micelle structure itself is stable. However, if there is even a little difference in any one of the following parameters: (1) type of surfactant, (2) type of solvent, (3) amount of water in reversed micelle, or if there is any difference in the order in which the materials making up the reverses micelles are introduced, the reversed micelle structure cannot be formed. Surfactants which can be used to form reversed micelles are not subject to any particular limitation, provided they are lipophilic or amphiphilic. The types of surfactants which form reversed micelles include, without particular limitation, cationic, anionic and nonionic surfactants, although a surfactant which has a high tolerance to the pH, temperature and various chemicals in the system and which is capable of maintaining stable reversed micelles is preferred. A surfactant for which the resulting reversed micelles are not destroyed by the platinum salt chemical reducing reaction carried out within the reversed micelle or the subsequently described photoreducing reaction, and which does not interfere with the reactions that arise within the reversed micelles is more preferred. A surfactant which is inert to the chemical reactions and the photoreactions is especially preferred for simplifying the process. Surfactants which have an ionicity that facilitates removal of the surfactant and moreover in which the lipophilic groups are relatively short chains are even more preferred. Two or more different surfactants may be used in admixture in order to stabilize or destabilize the reversed micelles.

Illustrative examples of surfactants that may be used in the embodiment include sodium di(2-ethylhexyl)sulfosuccinate (AOT), polyoxyethylene nonyl phenyl ether, magnesium laurate, zinc caprate, zinc myristate, sodium phenyl stearate, aluminum dicaprylate, tetraisoamylammonium thiocyanate, n-octadecyltri(n-butyl)ammonium formate, n-amyltri(n-butyl)ammonium iodide, sodium dinonylnaphthalene sulfonate, calcium cetyl sulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, didodecyldimethylammonium chloride, ditetradecyldimethylammonium chloride and (2-octyloxy-1-octyloxymethyl) polyoxyethylene ethyl ether. Solvents that can be used to form reversed micelles include organic solvents such as n-hexane, octane, nonane, decane and cyclohexane, and water. Solvents such as alcohols which have miscibility with both water and with organic solvents cannot be used to form reversed micelles.

FIG. 20 is a cross-sectional schematic drawing showing the structure of a reversed micelle. The reversed micelle structure 200 is a structure in which a surfactant 33 composed of hydrophilic groups 31 and lipophilic groups 32 is radially arranged so as to surround an aqueous phase 40. The outside of the reversed micelle structure is an oil phase. The reversed micelle diameter 41 is determined by the size of the crystalline $TiO_2$ particles used or the size of the amorphous particles that are synthesized. FIG. 21 is a graph showing the relationship between Rw (molar ratio of total water content to the surfactant) and the diameter of the reversed micelles when decane was used as the organic phase. In FIG. 21, the diameter of the reversed micelles (water droplet diameter) (nm) is plotted on the ordinate, and the Rw is plotted on the abscissa. As shown in the diagram, there is a linear relationship between the diameter of the reversed micelles and the molar ratio Rw ($y=1.2484x+6.4794$, $Rw^2=0.9996$). Therefore, the diameter of the reversed micelles can be controlled by the amount of water and the amount of surfactant.

The order of addition for the materials making up the reversed micelle is preferably one where the organic solvent such as decane and the surfactant such as AOT are mixed together, following which the aqueous solution or aqueous dispersion is added. Taking into account the stability of the reversed micelles, when dissolving the surfactant in the organic solvent, it is preferable to cool to room temperature or below and stirring in such a way that froth does not foam.

In this reduction method, a reducing agent is additionally mixed into the mixture of the dispersion of reversed micelles containing particles composed of the second oxide with the dispersion of reversed micelles containing platinum ions. When reversed micelles are not used and the reducing agent is merely added to a dispersion of a mixture of the oxide particles and the platinum ions, the reducing agent ends up uniformly dispersing within the liquid, making it impossible to efficiently reduce the surface of the particles composed of the second oxide. By additionally mixing a reducing agent into a mixture of reversed micelle dispersions as is done in this step, the reducing agent locally aggregates inside nano-order water droplets within the reversed micelles, enabling the nanostructure at the surface of the particles composed of the second oxide to be controlled.

The second oxide used in this reduction method is preferably $TiO_2$, $SnO_2$, $Ta_2O_5$ or $Nb_2O_5$. A dispersion of reversed micelles containing, of these metal oxides, $TiO_2$ particles can be prepared by adding a dispersion of the above amorphous particles, a dispersion of crystalline particles or an aqueous solution of $TiO_2$ particles to a solution obtained by adding a surfactant such as AOT to an organic solvent such as octane, nonane, decane or cyclohexane. Moreover, a dispersion of reversed micelles containing $TiO_2$ particles may be prepared by first creating reversed micelles that enclose titanium ions and synthesizing $TiO_2$ particles by alkali hydrolysis using nano-reaction field in the reversed micelles. Also, a dispersion of reversed micelles containing platinum ions may be prepared by adding the above-described aqueous solution of platinum ions to a solution obtained by adding a surfactant such as AOT to an organic solvent such as n-hexane, octane, nonane or decane.

The reducing agent used in this reduction method is not subject to any particular limitation, provided it is a reducing agent having a strong reducing ability. Illustrative examples include $NaBH_4$, hydrogen, hydrazine, sodium thiosulfate, citric acid, sodium citrate, L-ascorbic acid and formaldehyde.

Once reduction is complete and a platinum-containing outermost layer has formed on the surface of the particles composed of the second oxide, it is preferable to carry out the step of adding an alcohol to the reaction mixture and thereby destroying the reversed micelle structure. If the reversed micelle structure is not destroyed, surfactant such as AOT will remain in the vicinity of the catalyst particles. As a result, when the catalyst particles obtained by this method are used in a fuel cell, the surfactant may interfere with the electrochemical reactions. Moreover, the residual surfactant may infiltrate between the outermost layer and the inner particle or between the catalyst particles and the subsequently described carbon support, as a result of which outermost layer formation or support of the catalyst particles on the carbon support may be incomplete. The alcohol which may be used to destroy the reversed micelle structure is preferably an alcohol having both hydrophilicity and lipophilicity. Illustrative examples include lower alcohols such as methanol, ethanol and propanol. The reaction mixture to which the alcohol has been added is then furnished to the subsequently described heating step.

4-3-2. Reduction Using a Photoreduction Method

In a photoreduction method, a sacrificial reagent is additionally mixed into a mixture of a dispersion of particles composed of the second oxide having a photocatalytic activity with a dispersion of platinum ions, following which light irradiation is carried out. When a photoreduction method is used, the reduction of platinum only at the surface of the particles composed of the second oxide can be made to proceed by utilizing the photocatalytic activity particular to the second oxide. As a result, platinum can be made to deposit onto the surface of the particles composed of the second oxide at a high efficiency without any waste of platinum and with no formation of particles of platinum only. Moreover, the particles composed of the second oxide can be covered with platinum at a high coverage of from 90 to 100%.

The light source used in this reduction method is preferably a light source having a wavelength in the ultraviolet (UV) light range (350 to 430 nm). With a light source having a wavelength in excess of 430 nm, because the energy is lower, charge separation does not arise in the photocatalyst particles. As a result, the photocatalytic reaction does not proceed, making use problematic. When a visible light-responsive photocatalyst or an infrared light-responsive photocatalyst is used, the photocatalytic reaction can be made to proceed, enabling visible light or infrared light to be used. From the standpoint of whether the photocatalyst reaction proceeds or does not proceed, selecting the wavelength and the wavelength region is merely a parameter which controls the thickness and properties of the outermost layer.

Sacrificial reagents which may be used in this reducing method are not subject to any particular limitation, provided they oxidize at the surface of the particles composed of the second oxide under the effect of UV light. Illustrative examples of sacrificial reagents which may be used include polyalcohols such as ethylene glycol and ascorbic acid; higher fatty alcohols such as hexanol and decanol; and sugars having a reducing ability and a high hydrophilicity, such as sorbitol and glucose.

The second oxide having a photocatalytic activity used in this reducing method is preferably $TiO_2$ or $SnO_2$.

The above-described reversed micelles may be used in the photoreduction method. This may involve mixing a dispersion of reversed micelles containing particles composed of the second oxide having a photocatalytic activity together with a dispersion of reversed micelles containing platinum ions, adding a sacrificial reagent to the mixture, and carrying out light irradiation. In such a case, after an outermost layer containing platinum has been formed on at least the surface of the particles composed of the second oxide, it is preferable to destroy the reversed micelle structure by adding an alcohol to the reaction mixture.

The above-described reducing agent may be concomitantly used in this photoreduction method. The time at which the reducing agent is used may be prior to photoreduction, concurrent with photoreduction, or after photoreduction. With regard to the time of use of the reducing agent, preferably, the surface of the particles composed of the second oxide having a photocatalytic activity is preliminarily reduced with a reducing agent, following which platinum ions are mixed with the particles composed of the second oxide, and light irradiation is subsequently carried out. Alternatively, the particles composed of the second oxide having a photocatalytic activity may be mixed together with the platinum ions, then the reducing agent additionally admixed in the resulting mixture, and light irradiation subsequently carried out. It is also possible to mix together the particles composed of a second oxide having a photocatalytic activity with the platinum ions and carry out light irradiation, then to additionally mix the reducing agent into the light-irradiated mixture. In short, so long as a step is provided in which light irradiation is carried out on a mixture of the particles composed of the second oxide having a photocatalytic activity with the platinum ions, the reducing agent may be used at any other stage as well. Using the reducing agent only on platinum ions is not desirable from the standpoint that particles composed only of platinum will end up forming.

A typical example of this reduction method in which $TiO_2$ is used as the second oxide having a photocatalytic activity is explained. First, a platinum ion solution is mixed into a $TiO_2$ dispersion. Next, ethylene glycol is added as the sacrificial reagent to the mixture, and the resulting mixture is irradiated with UV light having a wavelength of from 350 to 430 nm, thereby reducing the platinum only at the surface of the $TiO_2$.

A modified example of this reduction method when $TiO_2$ is used as the second oxide having a photocatalytic activity is described. First, SBH, which is a strong reducing agent, is added to a dispersion of reversed micelles containing crystalline $TiO_2$ particles, partially reducing the $TiO_2$ particles, and thereby forming oxygen defects on the particles. Next, a dispersion of reversed micelles containing platinum ions is mixed into the dispersion of reversed micelles containing $TiO_2$ particles which have been subjected to partial reducing treatment. Then, ethylene glycol is added as a sacrificial reagent to the mixture, and the resulting mixture is irradiated with UV light having a wavelength of 350 to 430 nm, thereby reducing the platinum only at the surface of the $TiO_2$.

4-3-3. Pre-Reduction

The inventive method of manufacture may include, prior to the above-described reducing step, a pre-reducing step which involves the preliminary reduction of at least the particles composed of the second oxide within the dispersion of particles composed of the second oxide. In particular, when a photoreduction method is used, the method may be one where, in a pre-reducing step, a reducing agent is mixed into a dispersion of particles composed of a second oxide having a photocatalytic activity, or may be one where a sacrificial reagent is mixed into a dispersion of particles composed of a second oxide having a photocatalytic activity, followed by light irradiation.

4-4. Heating Step

This step entails heating the mixture after the reducing step. Here, "the mixture after the reducing step" refers to a mixture of all the materials mixed together up until this heating step, including the catalyst particles in which an outermost layer has formed at the reduced areas of the particles composed of the second oxide, the dispersant and/or solvent, and additionally, when employed, the subsequently described carbon support, surfactant, reducing agent, sacrificial reagent, and/or the alcohol used to destroy the reversed micelles. It is also possible to carry out filtration or the like prior to this heating step, and thereby remove beforehand liquids such as a dispersion medium or solvent. The heating method is not subject to any particular limitation, provided it is carried out at a temperature which promotes bonding of the oxygen defects in the particles composed of the second oxide with platinum atoms and which, in cases where a surfactant such as AOT has been added, enables the surfactant to be removed. The heating carried out in this step is preferably firing. The specific firing conditions are as follows. Initial conditions: 30 to 120 minutes of purging with inert gas at room temperature. Conditions of temperature increase to from 250 to 1300° C., and preferably to from 350 to 900° C.: temperature increase from room temperature to the above temperature over a period of 60 to 180 minutes. Holding conditions: holding for 30 to 120 minutes at above temperature. The above-indicated temperature is the temperature required to form bonds between the oxygen defects in the particles composed of the second oxide and platinum atoms.

4-5. Other Steps

Following the heating step, filtration, washing, drying and grinding of the catalyst particles may be carried out. Filtration and washing of the catalyst particles are not subject to any particular limitation, provided the methods used are capable of removing impurities without damaging the layer structure of the manufactured particles. Illustrative examples of such filtration and washing include methods in which separation is carried out by suction filtration using pure water as the solvent and using filter paper (#42, available from Whatman Ltd.). Drying of the catalyst particles is not subject to any particular limitation, provided the method used is capable of removing solvent and the like. Such drying is exemplified by a method of vacuum drying at a temperature of 60 to 100° C. for 10 to 20 hours. Grinding of the catalyst particles is not subject to any particular limitation, provided it involves a method which is capable of pulverizing the solid product. Illustrative examples of such grinding include grinding in a mortar or the like, and mechanical milling in a ball mill, turbomill, mechanofusion or disc mill.

5. Methods of Manufacturing Carbon-Supported Catalyst Particles

A first method of manufacturing carbon-supported catalyst particles serving as an embodiment of the invention is a method of manufacturing carbon-supported catalyst particles by supporting on a carbon support the catalyst particles which are obtained as described above. In the above-described reducing step which uses a reducing agent, mixing in a carbon support, either prior to additionally mixing a reducing agent into a mixture of a dispersion of reversed micelles containing particles composed of the second oxide with a dispersion of reversed micelles containing platinum ions, or after additionally mixing a reducing agent into such a mixture.

A second method of manufacturing carbon-supported catalyst particles serving as an embodiment of the invention is a method of manufacturing carbon-supported catalyst particles by supporting on a carbon support the catalyst particles which are obtained as described above. In the above-described reducing step which uses a light-irradiating apparatus, after additionally mixing a sacrificial reagent into a mixture of a dispersion of particles composed of the second oxide with a dispersion of platinum ions and irradiating the mixture with light, additionally mixing a carbon support into the light-irradiated mixture.

The two above manufacturing methods share in common the additional mixture of a carbon support material into a mixture containing both particles composed of the second oxide and also platinum ions. In the first manufacturing method in which a reducing agent is used, whether the reducing agent is mixed into the mixture containing both particles composed of the second oxide and also platinum ions following admixture of the carbon support, or whether the carbon support is mixed in following admixture of the reducing agent makes no particular difference in the resulting carbon-supported catalyst particles. However, in the second manufacturing method in which photoreduction is used, if light irradiation is carried out after admixture of the carbon support and the sacrificial reagent to the mixture containing both particles composed of the second oxide and also platinum ions, the carbon support will hinder the photocatalytic activity of the second oxide, as a result of which the platinum reducing reaction will fail to proceed, which is undesirable. Therefore, in the second manufacturing method of the invention, admixture of the carbon support is carried out only after the additional admixture of the sacrificial agent to the mixture containing both particles composed of the second oxide and also platinum ions, and light irradiation.

The above-described carbon support may be used in the above first and second manufacturing methods. Of such carbon supports, in the above first and second manufacturing methods, carbon materials such as acetylene black, furnace black, carbon black, activated carbon, mesophase carbon and graphite may be used either singly or as a mixture of two or more types thereof.

6. Presumptive Mechanisms

Figure 2A:
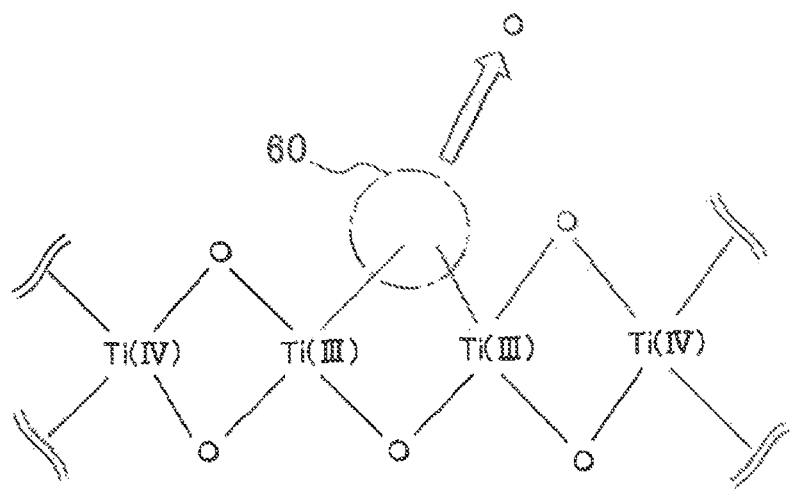
FIGS. 2A and 2B are respectively diagrams which schematically show, both before crystalline $TiO_2$ is reduced with a reducing agent and after it has been reduced, a portion of the $TiO_2$.
Figure 2B:
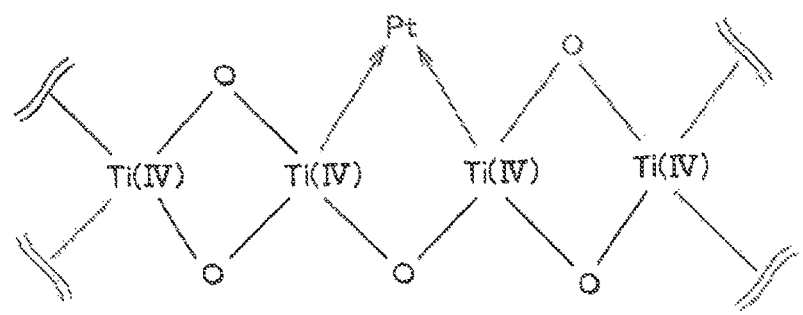

The mechanisms which underlie why the catalyst particles manufactured by the method of this embodiment have a high activity and a high durability are described below. FIGS. 2A and 2B are respectively diagrams which schematically show, both before crystalline $TiO_2$ is reduced with a reducing agent and after it has been reduced, a portion of the $TiO_2$. In the diagrams, "Ti(IV)" represents titanium atoms having a valence of +4, "Ti(III)" represents titanium atoms have a valence of +3, "O" represents oxygen atoms, and the straight lines represents bonds between the atoms. Double wavy lines signify omissions in the diagram. FIG. 2A is a schematic diagram showing how a portion of the Ti (IV) in the crystalline $TiO_2$ is reduced to Ti (III) by the above-described reduction method. Some of the oxygen dissociates at this time, giving rise to oxygen defects 60. The fact that oxygen defects are thus generated by reduction and the crystallinity of crystalline $TiO_2$ is lost has been confirmed also in analyses of the carbon-supported catalyst particles obtained in the subsequently described Example 3. FIG. 2B is a schematic diagram showing the formation of Pt—Ti bonds due to the bonding of oxygen defect sites with platinum atoms as a result of heat treatment following the reducing step. The fact that Pt—Ti bonds form due to heating has been confirmed also in analyses of the carbon-supported catalyst particles obtained in the subsequently described Example 3.

As shown in FIG. 2B, Ti (IV) is more stable than Ti (III), and thus preferable, as the titanium atoms which form Pt—Ti bonds. What this means is that Ti (III) donates an electron to platinum and is thereby oxidized to Ti (IV). Due to the occurrence of such electron donation to platinum by titanium, the electron occupancy of the platinum $5d$ orbital increases, making oxygen adsorption to the platinum difficult. Redox reactions on a platinum catalyst are basically determined by the ease with which oxygen adsorption to platinum occurs. "Oxygen adsorption to platinum" has to do with the formation of a bonding orbital between the platinum $5d$ orbital and the empty oxygen $2p$ orbital. Generally, the catalyst activity is low both when oxygen adsorption to the metal catalyst is difficult, and when oxygen adsorbs to the metal catalyst and strongly and excessively. That is, to maintain a high catalyst activity, there exists a optimal value for oxygen adsorption. Given that platinum is a metal which, even among metal catalysts, readily gives rise to oxygen adsorption, the fact that oxygen adsorption to platinum does not readily occur is effective for increasing the catalytic activity for oxygen reduction reaction (ORR).

Figure 3:
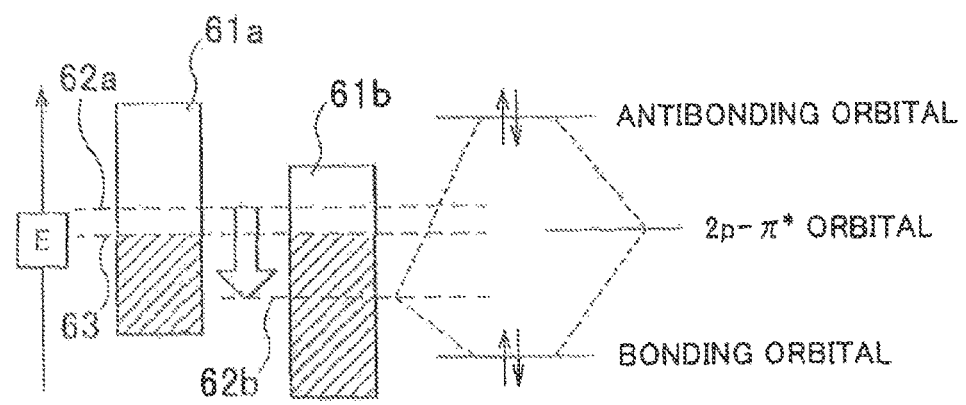
FIG. 3 is an energy level diagram for oxygen adsorption on platinum.

Lowering the stabilization energy of the antibonding orbitals that form at the platinum $5d$ orbital and the oxygen $2p$ orbital is effective for discouraging oxygen adsorption to platinum. In order to lower the stabilization energy, it is effective to donate an electron to platinum and lower the d-band center of platinum. FIG. 3 is an energy level diagram of when oxygen is adsorbed onto platinum. The d-band center 62a in the d-band 61a of platinum prior to electron donation has a higher energy level than the Fermi level 63. Therefore, the portion of the electrons below the Fermi level 63 in the d-band 61a (which portion is indicated by the hatching) all occupy bonding orbitals formed by the platinum $5d$ orbital and the oxygen $2p$-$\pi^*$ orbital. As a result, the platinum adsorbs oxygen more easily. On the other hand, when electron donation from $TiO_2$ occurs in the platinum $5d$ orbital, the Fermi level remains the same, with the energy level of the platinum $5d$ orbital decreasing and the d-band center also decreasing. The d-band center 62b within the platinum d-band 61b following electron donation has an energy level which is lower than the Fermi level 63. Accordingly, the energy levels of those platinum $5d$ orbitals which had formed bonding orbitals with the oxygen $2p$-$\pi^*$ orbital decrease. Hence, the energy difference between the energy level of the platinum $5d$ orbitals which form bonds and the energy level of the oxygen $2p$-$\pi^*$ orbitals widens, as a result of which the adsorptivity of oxygen to platinum is weaker than before electron donation. By forming in this way an easily reduced platinum layer (i.e., a platinum layer which does not readily undergo oxidative degradation) on the oxide particles, catalyst particles which exhibit an excellent durability can be obtained.

7. Other Applications

The catalyst particles and the carbon-supported catalyst particles according to these embodiments may be used not only in the above-described fuel cell catalyst, but also in conventional platinum catalyst reactions and applications thereof. In the catalyst particles and carbon-supported catalyst particles of these embodiments, because the particle interior is composed of an oxide, the amount of platinum employed can be decreased compared with conventional cases in which platinum particles are used, enabling dramatically lower costs to be achieved. Examples of other applications include use in degradative reduction reactions on nitrogen oxides (NOx), use in degradative reactions on water as a photocatalyst or co-catalyst thereto, use in various types of chemical reactions that are based on redox reactions, and biomass degrading catalysts and biocatalysts.

The embodiments of this invention are illustrated more fully below by way of the following examples. It should be noted, however, that the invention, to the extent that it does not depart from the spirit and scope thereof, is not limited by these examples.

1. Manufacture of Carbon-Supported Catalyst Particles 1-1. Methods of Manufacture Using Reversed Micelles 1-1-1. Method of Manufacture Using Amorphous $TiO_2$

Example 1

(a) Preparation of $TiO_2$ Particle-Containing Reversed Micelles

First, a 0.1 mol/L aqueous solution of $TiCl_4$ was prepared by diluting 1 mL of a hydrochloric acid solution of $TiCl_4$ (16 to 17%/1.5 g/mL) with 49 mL of purified water. Next, 183 mL of decane and 17.27 g of AOT were added to a 1,000 mL beaker and stirred for 1 hour with a magnetic stirrer. Then, 3 mL of the 0.1 mol/L aqueous solution of $TiCl_4$ was added to the stirred solution, and stirring was carried out again for 1 hour. Finally, 1.2 mL of a 0.1 mol/L aqueous solution of NaOH was added by micropipette to the stirred solution, and stirring was carried out for another 18 hours, thereby giving a dispersion of reversed micelles containing $TiO_2$ particles.

(b) Preparation of Reversed Micelles Containing Platinum Ions

First, a 0.1 mol/L aqueous solution of $H_2PtCl_6$ was prepared by dissolving 5.1778 g of $H_2PtCl_6.6H_2O$ in 98.9 mL of purified water. Next, 183 mL of decane and 17.62 g of AOT were added to a 1,000 mL beaker and stirred for 1 hour with a magnetic stirrer. Then, 4.3 mL of the 0.1 mol/L aqueous solution of $H_2PtCl_6$ was added to the stirred solution and stirring was carried out again for 1 hour, thereby giving a dispersion of reversed micelles containing platinum ions.

(c) Mixture and Reduction of Reversed Micelles

The dispersion of reversed micelles containing $TiO_2$ particles and the dispersion of reversed micelles containing platinum ions prepared as described above were mixed together and stirred for 3 hours with a magnetic stirrer. Next, 0.3029 g of carbon black (Ketjen) was added as the carbon support and stirring was carried out at 10° C. for 30 minutes, following which 0.1589 g of SBH powder was added and stirring was carried out for 2 hours. In addition, 300 mL of a 2-propanol/ethanol=4:1 mixture was added, and stirring was carried out at 10° C. for one hour. The dispersion was subjected to suction filtration, and a solid (catalyst precursor) was recovered. The recovered solid was washed with 500 mL of a decane/alcohol=4.3:3.0 mixture, then vacuum dried for 18 hours at 80° C.

(d) Firing (600° C.)

An amount of 0.4 g of the catalyst precursor powder obtained as described above was fired under the following conditions.

Initial conditions: Argon purging was carried out at room temperature for 60 minutes (Ar feed rate, 750 mL/min; Ar purity, 99.9999%).

Temperature increase conditions: The temperature was raised from room temperature to 600° C. over a period of 120 minutes.

Holding conditions: The catalyst powder was held and fired at 600° C. for 60 minutes, then washed with 80° C. purified water, giving the carbon-supported catalyst particles of Example 1.

Example 2

(e) Firing (500° C.)

The same procedure as in Example 1 above, up until mixture of the reversed micelles and reduction, was carried out. Of the catalyst precursor powders obtained by the above methods, 0.4 g was fired under the following conditions.

Initial conditions: Argon purging was carried out at room temperature for 60 minutes (Ar feed rate, 750 mL/min; Ar purity, 99.9999%).

Temperature increase conditions: The temperature was raised from room temperature to 500° C. over a period of 120 minutes.

Holding conditions: The catalyst powder was held and fired at 500° C. for 60 minutes, then washed with 80° C. purified water, giving the carbon-supported catalyst particles of Example 2.

1-1-2. Method of Manufacture Using Crystalline $TiO_2$

Example 3

(a) Preparation of Reversed Micelles Containing $TiO_2$ Particles

First, 462 mL of decane and 20.4068 g of AOT were added to a 1,000 mL beaker and stirred for 1 hour with a magnetic stirrer. Next, 10 g of an anatase-type crystalline $TiO_2$ sol (available under the trade name Tynoc M-6 from Taki Chemical Co., Ltd.) was added to the stirred solution, and stirring was carried out again for 3 hours, giving a dispersion of reversed micelles containing $TiO_2$ particles.

(b) Preparation of Reversed Micelles Containing Platinum Ions

First, a 0.1 mol/L aqueous solution of $H_2PtCl_6$ was prepared by dissolving 5.1778 g of $H_2PtCl_6.6H_2O$ in 99 mL of purified water. Next, 462 mL of decane and 20.89 g of AOT were added to a 1,000 mL beaker and stirred for 1 hour with a magnetic stirrer. Then, 10.16 mL of the 0.1 mol/L aqueous solution of $H_2PtCl_6$ was added to the stirred solution and stirring was carried out again for 1 hour, thereby giving a dispersion of reversed micelles containing platinum ions.

(c) Mixture of Reversed Micelles and Reduction

The dispersion of reversed micelles containing $TiO_2$ particles and the dispersion of reversed micelles containing platinum ions prepared as described above were mixed together and stirred for 1 hour with a magnetic stirrer. Next, 0.565 g of carbon black (Ketjen) was added as the carbon support and stirring was carried out at 10° C. for 30 minutes, following which 0.38 g of SBH powder was added and stirring was carried out for 5 hours. In addition, 500 mL of a mixture in which the ratio between a 2-propanol and ethanol is 4:1 was added, and 30 minutes of stirring was carried out at 10° C. The dispersion was subjected to suction filtration, and a solid (catalyst precursor) was recovered. The recovered solid was washed with 500 mL of a decane/alcohol=4.3:3.0 mixture, then vacuum dried for 18 hours at 80° C.

(d) Firing (700° C.)

The catalyst precursor powder obtained as described above was fired under the following conditions.

Initial conditions: Argon purging was carried out at room temperature for 60 minutes (Ar feed rate, 750 mL/min; Ar purity, 99.9999%).

Temperature increase conditions: The temperature was raised from room temperature to 700° C. over a period of 120 minutes.

Holding conditions: The catalyst powder was held and fired at 700° C. for 60 minutes, then washed with 80° C. purified water and subsequently vacuum-dried at 80° C. for 18 hours, giving the carbon-supported catalyst particles of Example 3.

1-1-3. Method of Manufacture Using $SnO_2$ Particle-Containing Reversed Micelles and Platinum Ion-Containing Reversed Micelles Example 4

(a) Preparation of Partially Reduced $SnO_2$ Particle-Containing Reversed Micelles First, a 0.1 mol/L aqueous solution of $SnCl_4$ was prepared by dissolving $SnCl_4$ in purified water. Next, 10.29 g of the surfactant AOT was dissolved in 75 g of cyclohexane, and the solution was stirred for 1 hour with a magnetic stirrer. Next, 2.5 mL of the above 0.1 mol/L aqueous solution of $SnCl_4$ was added to the stirred solution, and the resulting mixture was stirred for 2 hours. The molar ratio of water to surfactant ([$H_2O$]/[surfactant]) was adjusted at this time to 6. Next, 8 mol/L NaOH was added in a 4-fold molar ratio (0.25 mL) with respect to the tin in $SnCl_4$, thereby preparing $SnO_2$-containing reversed micelles. Then, 0.047 g of SBH powder was added and stirring was carried out for 2 hours, thereby giving a dispersion of reversed micelles containing partially reduced $SnO_2$ particles.

(b) Preparation of Platinum Ion-Containing Reversed Micelles

First, a 0.1 mol/L aqueous solution of $H_2PtCl_6$ was prepared by dissolving 2.59 g of $H_2PtCl_6.6H_2O$ in 49.9 g of ultrapure water. Next, 830 mL of decane and 77.1 g of AOT were added to a 2,000 mL beaker and stirring was carried out for 1 hour with a magnetic stirrer. Then, 18.75 mL of the 0.1 mol/L aqueous solution of $H_2PtCl_6$ was added to the stirred solution and stirring was again carried out for 1 hour, thereby giving a dispersion of reversed micelles containing platinum ions.

(c) Mixture of Reversed Micelles and Reduction with SBH

The dispersion of reversed micelles containing partially reduced $SnO_2$ particles and the dispersion of reversed micelles containing platinum ions prepared as described above were mixed together and stirred for 1 hour with a magnetic stirrer. Next, after confirming that the solution had turned clear, SBH was added in a 10-fold molar amount with respect to the platinum ions, and stirring was again carried out for 1 hour. Then 1.129 g of a carbon support (available under the trade name VXC-72R from Cabot Japan KK) was added to the reaction mixture in a loading of 40% by mass per 100% by mass of the combined amount of platinum and $SnO_2$, and stirring was again carried out for 1 hour. Next, 100 mL of 2-propanol was added to the reaction mixture, thereby destroying the reversed micelles and causing the catalyst to be supported on the carbon. The product was recovered by vacuum filtration, giving the carbon-supported catalyst particles of Example 4.

1-2. Production by Photoreduction 1-2-1. Production of Catalyst Particles using Aqueous Platinum Solution and Aqueous $TiO_2$ Solution Example 5

(a) Mixture of Aqueous Platinum Solution and Aqueous $TiO_2$ Solution

First, 50 mL of a 0.025 mol/L aqueous solution of platinum was prepared. Next, 34 mL of the aqueous platinum solution was adjusted to pH 4 by the appropriate addition of a 1 mol/L aqueous NaOH solution. An aqueous $TiO_2$ solution was then prepared by diluting 35 g of an anatase-type crystalline $TiO_2$ sol (Tynoc M-6, available under this trade name from Taki Chemical Co., Ltd.) with 235 g of purified water. About 34 mL of the aqueous platinum solution that had been adjusted to pH 4 and 270 g of the aqueous solution of $TiO_2$ were added to a 500 mL beaker, in addition to which 0.2 g of ethylene glycol was also added, and stirring was carried out for 1 hour.

(b) Photoreduction

Figure 14:
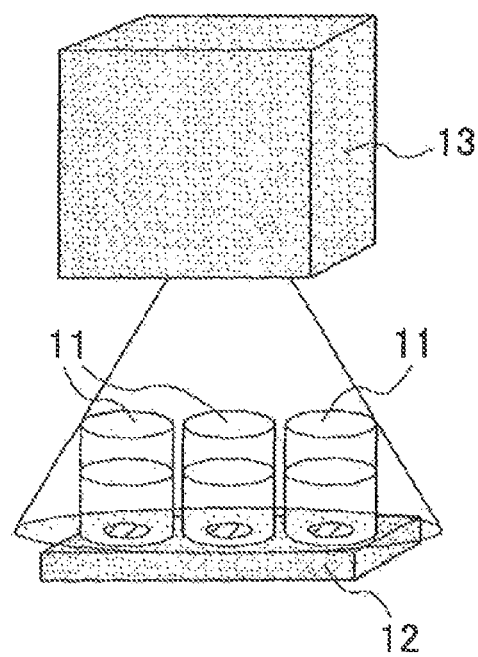
FIG. 14 is a schematic drawing of an apparatus used to carry out light irradiation.
Figure 15:
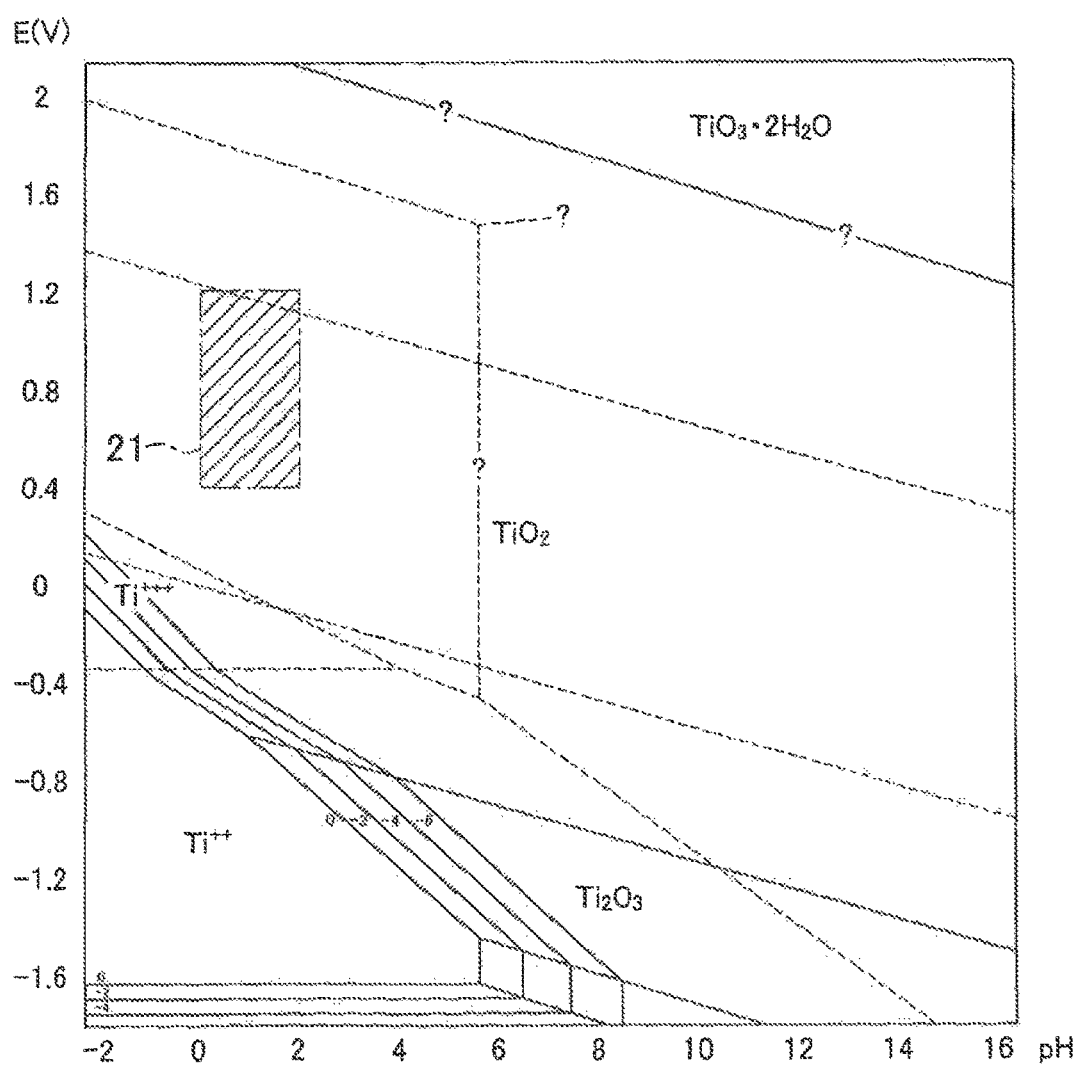
FIG. 15 is a potential/pH diagram for a titanium-water system at 25° C.
Figure 17:
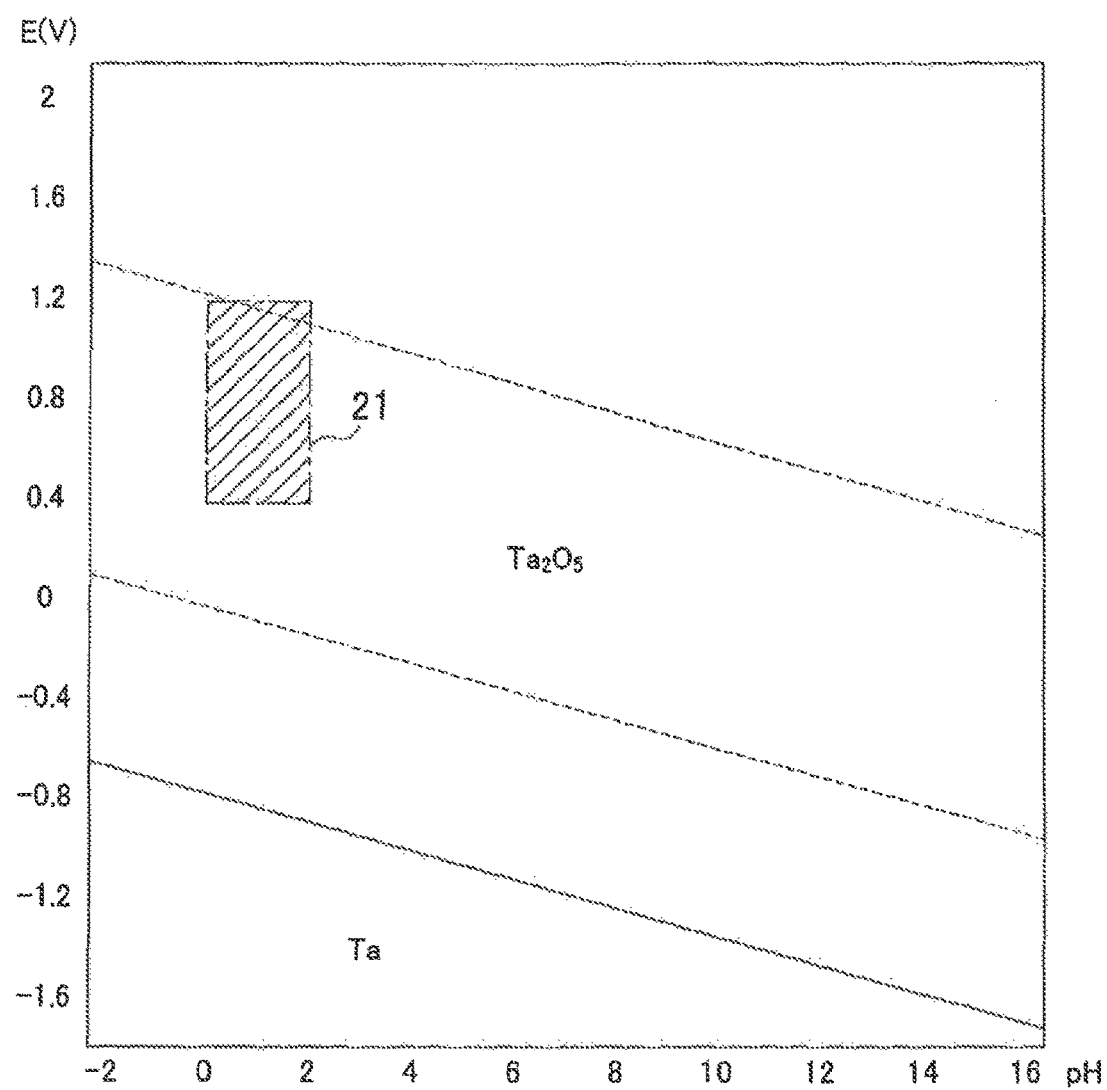
FIG. 17 is a potential/pH diagram for a tantalum-water system at 25° C.
Figure 18:
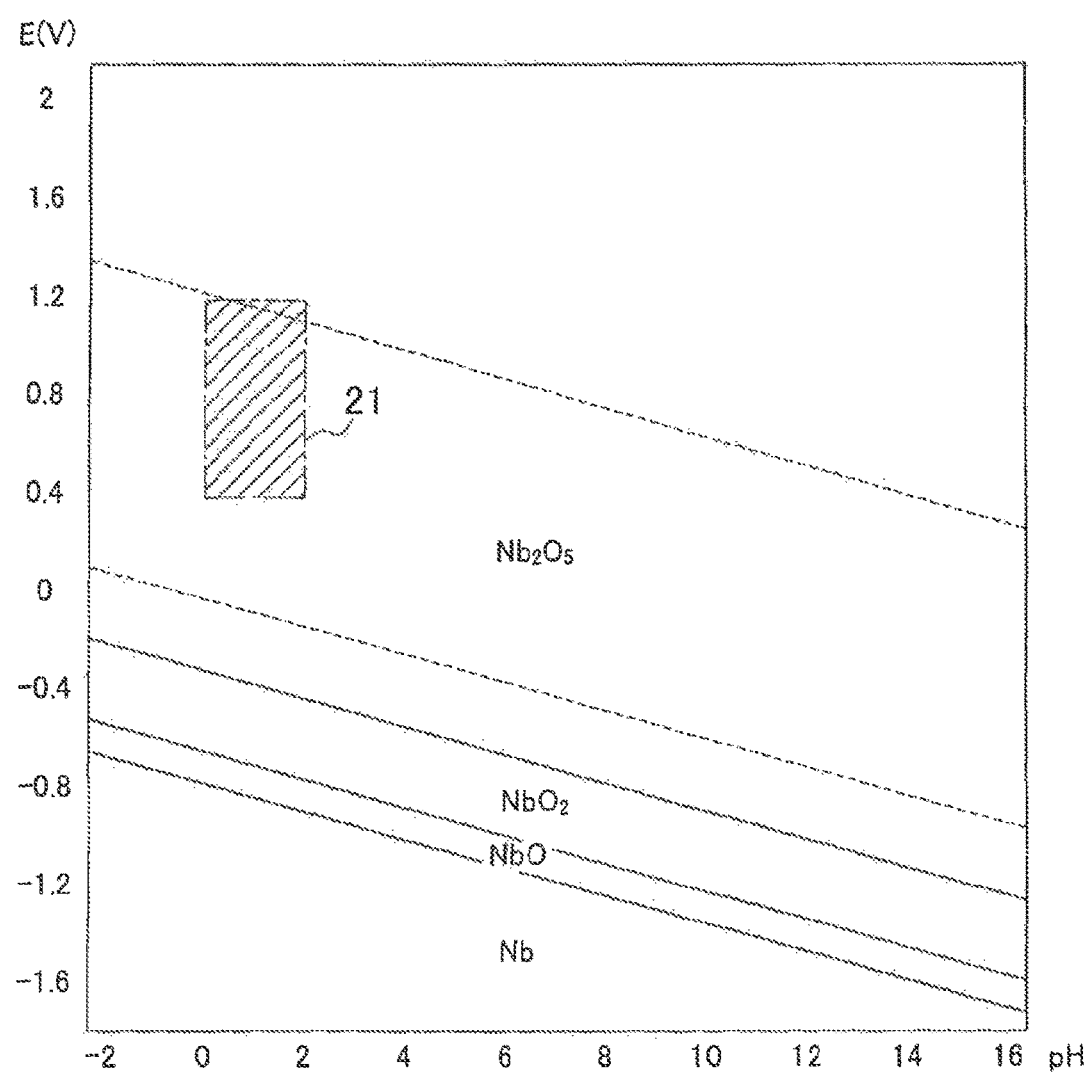
FIG. 18 is a potential/pH diagram for a niobium-water system at 25° C.
Figure 19:
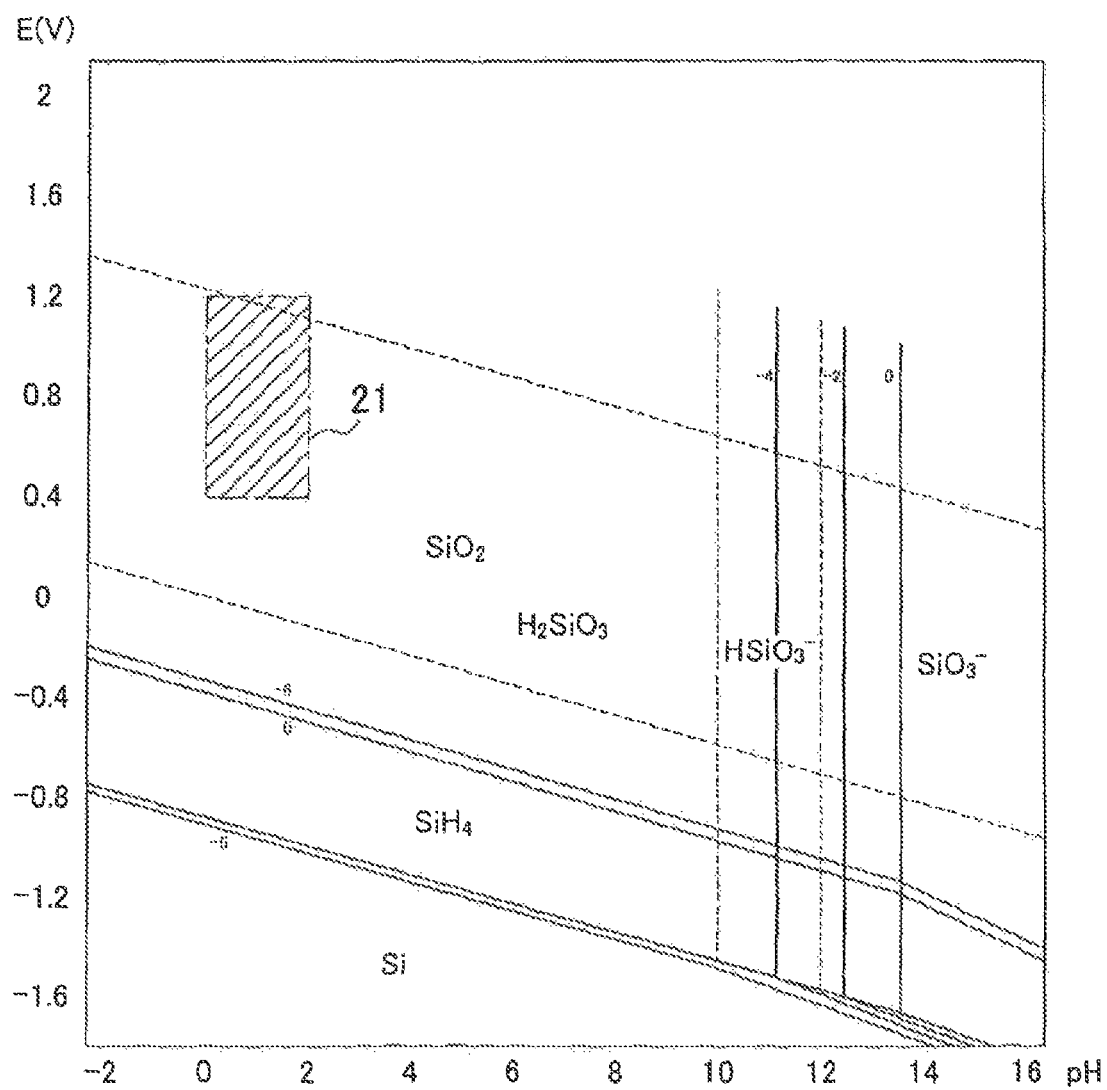
FIG. 19 is a potential/pH diagram for a silicon-water system at 25° C.

FIG. 14 shows a schematic view of the apparatus used to carry out light irradiation. Light irradiation was carried out in a darkroom. The platinum-$TiO_2$-ethylene glycol mixed solutions within the containers 11 were uniformly irradiated with light that included UV wavelengths (350 to 430 nm) by means of a UV irradiator 13 while being uniformly stirred with stirrers 12. The solutions after 1 hour, 2 hours, 3 hours, 4 hours, 6 hours, 12 hours, 16 hours, 18 hours and 24 hours were observed, and irradiation was ended 24 hours after the platinum reduction had proceeded to completion and the solution had turned black. The photoreduction conditions were as follows.

UV irradiator: 500 W high-pressure UV lamp (USH-500SC2, from Ushio Inc.)
Output: 250 W
Primary UV wavelengths: 436 nm, 405 nm, 365 nm
Distance from light source to specimen: 1 to 5 m (c) Carbon Support Carbon black (Ketjen), 1.511 g, was added as the carbon support to the platinum-$TiO_2$ mixed solution following the end of irradiation, and 6 hours of stirring was carried out. Next, the solvent was driven off from the solution with an evaporator, and 18 hours of vacuum-drying was carried out at a temperature of 80° C.

(d) Firing (300° C.)

The catalyst precursor powder obtained as described above was fired under the following conditions.

Initial conditions: Argon purging was carried out at room temperature for 60 minutes (Ar feed rate, 750 mL/min; Ar purity, 99.9999%).
Temperature increase conditions: The temperature was raised from room temperature to 300° C. over a period of 120 minutes.
Holding conditions: The catalyst powder was held and fired at 300° C. for 60 minutes, then washed with 80° C. purified water and vacuum-dried at 80° C. for 18 hours, giving the carbon-supported catalyst particles of Example 5.

1-2-2. Method of Manufacture Using $TiO_2$ Particle-Containing Reversed Micelles and Platinum Ion-Containing Reversed Micelles (Platinum Single-Atom Layer)

Example 6

(a) Preparation of Surface-Reduced $TiO_2$ Particle-Containing Reversed Micelles There are two methods for controlling the thickness of the platinum layer: one involves control by means of the amount of platinum introduced, and the other involves reducing the thickness of the platinum layer by potential treatment after platinum coating. In Examples 6 to 8 below, use was made of the method for controlling the thickness of the platinum layer by means of the amount of platinum introduced. This method of control is possible in the photoreduction method because platinum reducing reactions arise only at the surface of the inner particle. The amount of platinum introduced is determined by the diameter of the inner particles used. First, an aqueous solution of $TiO_2$ diluted to 0.1 mol/L was prepared by adding 66 mL of purified water to 10 g of an anatase-type crystalline $TiO_2$ sol (available under the trade name Tynoc M-6 from Taki Chemical Co., Ltd.; 0.75 mol/L). Next, 100 mL of decane and 2.2 g of AOT were added to a beaker and stirred for 1 hour with a magnetic stirrer. Next, 0.53 mL of the 0.1 mol/L aqueous solution of $TiO_2$ was added to the stirred solution, and 1 hour of stirring was carried out in order to stabilize the reversed micelle structure. This was followed by an additional 3 hours of stirring. Next, 2.5574 g of SBH powder was added and stirring was carried out for 2 hours, thereby giving a dispersion of reversed micelles containing partially reduced $TiO_2$ particles.

(b) Preparation of Platinum Ion-Containing Reversed Micelles

First, a 0.1 mol/L aqueous solution of $H_2PtCl_6$ was prepared by dissolving 2.59 g of $H_2PtCl_6.6H_2O$ in 49.9 g of purified water. Next, 100 mL of decane and 2.2 g of AOT were added to a beaker and stirred for 1 hour with a magnetic stirrer. Then, 0.53 mL of the 0.1 mol/L aqueous solution of $H_2PtCl_6$ was added to the stirred solution and stirring was again carried out for 1 hour, thereby giving a dispersion of reversed micelles containing platinum ions.

(c) Mixture of Reversed Micelles and Photoreduction

First, the dispersion of reversed micelles containing partially reduced $TiO_2$ particles and the dispersion of reversed micelles containing platinum ions prepared as described above were mixed, and the mixture was stirred for 1 hour with a magnetic stirrer. Next, as shown in FIG. 14, while uniformly stirring the mixture within the containers 11 with magnetic stirrers 12, the mixtures were uniformly exposed in a darkroom to only UV light from a UV irradiator 13 and passed through a filter (UG11) for 24 hours. The photoreduction conditions were as follows.

UV irradiator: 500 W high-pressure UV lamp (USH-500SC2, from Ushio Inc.)
Output: 500 W
Wavelength: 350 to 420 nm
Distance from light source to specimen: 30 cm (d) Carbon Support Carbon black (Ketjen), 2.13 g, was added as the carbon support to the platinum-$TiO_2$ mixed solution following the end of irradiation, and 30 minutes of stirring was carried out at a temperature of not greater than 10° C. Next, 200 mL of a mixed solution (2-propanol/ethanol=4:1) was added and 30 minutes of stirring was carried out at 10° C., thereby destroying the reversed micelles and causing the catalyst to be supported on the carbon. Next, suction filtration was carried out on the dispersion, and a solid (catalyst precursor) was recovered. The recovered solid was washed with 500 mL of a decane/alcohol=4.3:3.0 mixed solution, then vacuum dried for 18 hours at a temperature of 80° C.

(e) Firing (500° C.)

The catalyst precursor powder obtained as described above was fired under the following conditions.
Initial conditions: Argon purging was carried out at room temperature for 60 minutes (Ar feed rate, 750 mL/min; Ar purity, 99.9999%).
Temperature increase conditions: The temperature was raised from room temperature to 500° C. over a period of 120 minutes.
Holding conditions: The catalyst powder was held and fired at 500° C. for 60 minutes, then washed with 80° C. purified water and vacuum-dried at 80° C. for 18 hours, giving the carbon-supported catalyst particles of Example 6 which were covered with a single-atom layer of platinum.

1-2-3. Method of Manufacture Using $TiO_2$ Particle-Containing Reversed Micelles and Platinum Ion-Containing Reversed Micelles (Platinum Three-Atom Layer)

Example 7

The same procedure was followed as in Example 6 up through preparation of the surface-reduced $TiO_2$ particle-containing reversed micelles. Preparation of the platinum ion-containing reversed micelles was carried out as follows. First, an aqueous 0.1 mol/L solution of $H_2PtCl_6$ was prepared by dissolving 2.59 g of $H_2PtCl_6.6H_2O$ in 49.9 g of purified water. Next, 150 mL of decane and 6.5 g of AOT were added to a beaker, and stirring was carried out for 1 hour with a magnetic stirrer. Then, 1.58 mL of the aqueous 0.1 mol/L $H_2PtCl_6$ solution was added to the stirred solution, following which stirring was carried out for 1 hour, thereby giving a dispersion of reversed micelles containing platinum ions. Mixing of the reversed micelles, photoreduction, carbon support and firing were subsequently carried out in the same way as in Example 6, thereby giving the carbon-supported catalyst particles of Example 7 which were covered with a platinum three-atom layer.

1-2-4. Method of Manufacture Using $TiO_2$ Particle-Containing Reversed Micelles and Platinum Ion-Containing Reversed Micelles (Platinum 10-Atom Layer)

Example 8

The same procedure was followed as in Example 6 up through preparation of the surface-reduced $TiO_2$ particle-containing reversed micelles. Preparation of the platinum ion-containing reversed micelles was carried out as follows. First, an aqueous 0.1 mol/L solution of $H_2PtCl_6$ was prepared by dissolving 2.59 g of $H_2PtCl_6.6H_2O$ in 49.9 g of purified water. Next, 250 mL of decane and 21.7 g of AOT were added to a beaker, and stirring was carried out for 1 hour with a magnetic stirrer. Then, 5.28 mL of the aqueous 0.1 mol/L $H_2PtCl_6$ solution was added to the stirred solution, following which stirring was carried out for 1 hour, thereby giving a dispersion of reversed micelles containing platinum ions. Mixing of the reversed micelles, photoreduction, carbon support and firing were subsequently carried out in the same way as in Example 6, thereby giving the carbon-supported catalyst particles of Example 8 which were covered with a platinum 10-atom layer.

1-2-5. Method of Manufacture Using $SnO_2$ Particle-Containing Reversed Micelles and Platinum Ion-Containing Reversed Micelles Example 9

Preparation of the reversed micelles containing partially reduced $SnO_2$ particles and preparation of the reversed micelles containing platinum ions was the same as in Example 4 described above. SBH was added to the $SnO_2$ particle-containing reversed micelles in a molar ratio with respect to tin of 0.5 and stirring was carried out for 1 hour. A dispersion of reversed micelles containing platinum ions was then mixed into the reaction mixture, following which sorbitol was added as a sacrificial reagent in an amount of 2 moles per mole of platinum and the mixture was irradiated with light for 3 days using a high-pressure mercury vapor lamp. Following light irradiation, carbon support and vacuum filtration were carried out in the same way as in Example 4, giving the carbon-supported catalyst particles of Example 9.

2. Analysis of Catalyst Particles 2-1. Analysis of Carbon-Supported Catalyst Particles of Example 3

Structural and compositional analyses of the carbon-supported catalyst particles of Example 3 were carried out by measurement using the HAADF method and measurement using EDS.

Figure 4A:
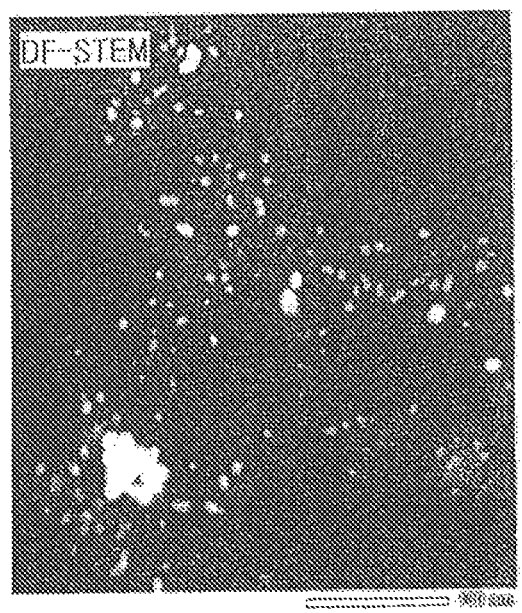
FIGS. 4A and 4B are electron micrographs which capture the results of high-angle annular dark-field (HAADF) observation of the carbon-supported catalyst particles of Example 3.
Figure 4B:
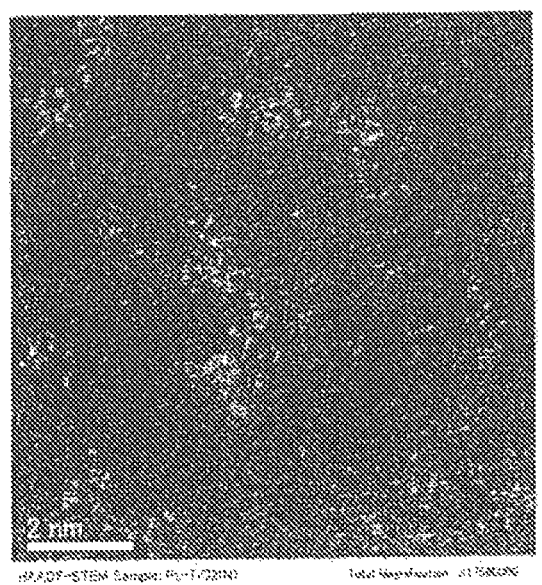
Figure 5A:
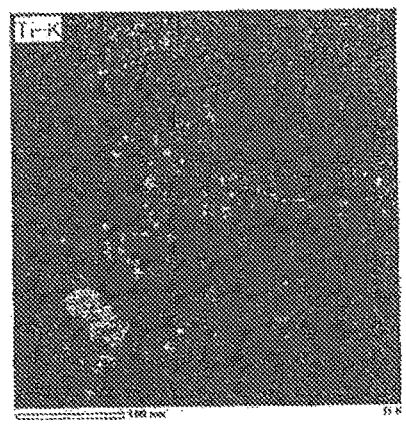
FIGS. 5A to 5C are electron micrographs which capture the results of energy dispersive x-ray spectroscopy (EDS) surface analysis of the carbon-supported catalyst particles of Example 3.
Figure 5B:
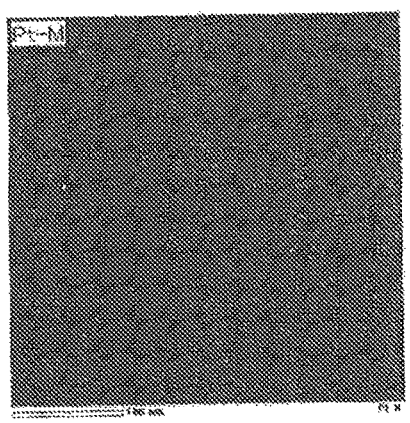
Figure 5C:
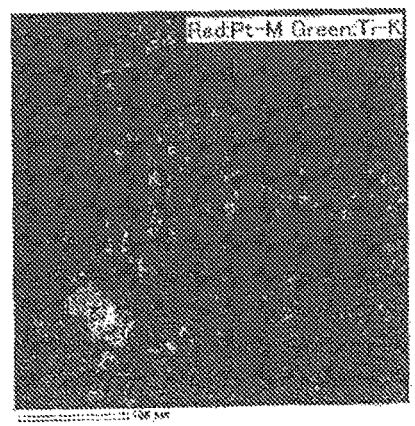

FIGS. 4A and 4B are electron micrographs which capture the results of HAADF measurement of the carbon-supported catalyst particles of Example 3, and FIGS. 5A to 5C are electron micrographs which capture the results of EDS surface analysis of the carbon-supported catalyst particles of Example 3. The HAADF measurement conditions were as follows. Dark-field scanning transmission electron microscopic (STEM) observation was carried out using a field emission transmission electron microscope (JEM-2100F with Cs corrector, manufactured by JEOL Ltd.) and at an acceleration voltage of 200 kV, both over a visual field of 0.3 µm×0.3 (magnification, 400,000×; FIG. 4A) and over a visual field of 8 nm×8 nm (magnification, 17,500,000×; FIG. 4B). It is apparent from FIG. 4B that the primary particle size of the catalyst particles obtained was about 10 to 20 nm. The EDS measurement conditions were as follows. Mapping analysis by EDS was carried out using a field emission transmission electron microscope (JEM-2100F with Cs corrector, manufactured by JEOL Ltd.) equipped with a UTW-type Si (Li) semiconductor detector, and regions where platinum atoms and $TiO_2$ are both present were detected. FIGS. 5A to 5C are electron micrographs captured showing elements in the same visual field as in FIG. 4A. FIG. 5A is an image captured of the element titanium, FIG. 5B is an image captured of the element platinum, and FIG. 5C is an image obtained by superimposing FIGS. 5A and 5B. As is apparent from FIG. 5C, because places where the element titanium is present and places where the element platinum is present substantially overlapped, it was possible to confirm that, in the carbon-supported catalyst particles of Example 3, platinum is present on the surface of crystalline $TiO_2$.

Figure 6A:
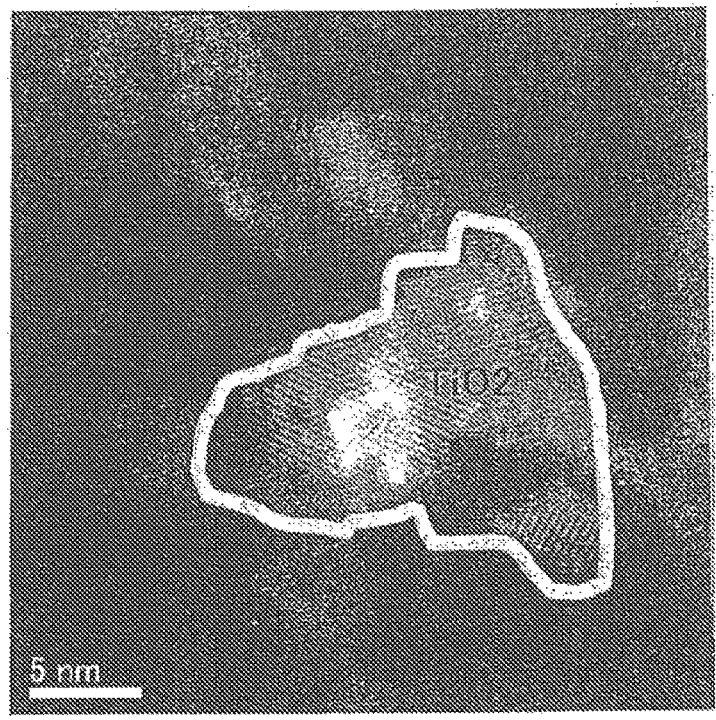
FIGS. 6A and 6B are respectively electron micrographs of a $TiO_2$ catalyst particle just prior to the addition of sodium borohydride (SBH) powder in Example 3, and of a carbon-supported catalyst particle in Example 3.
Figure 6B:
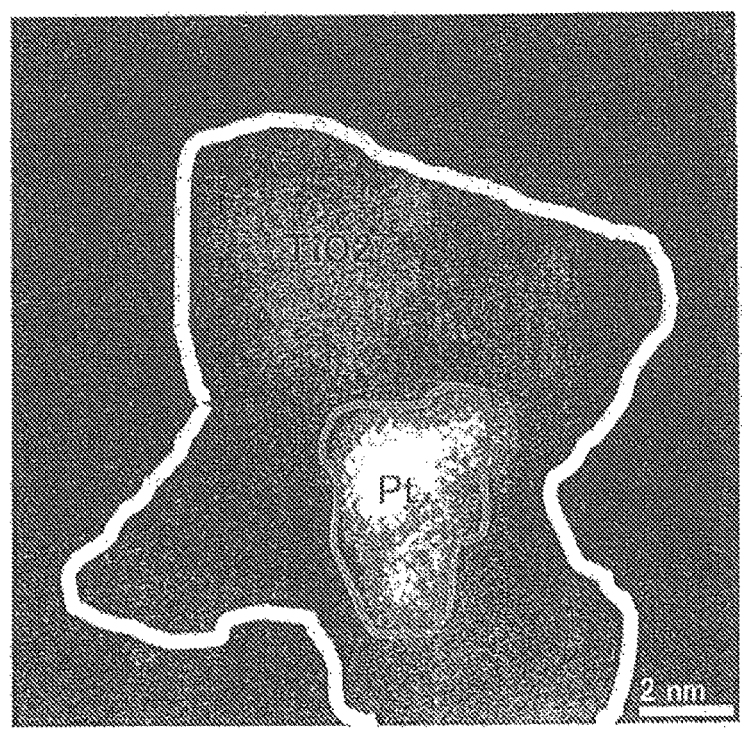

STEM observation was carried out on the $TiO_2$ particles just before adding SBH powder in Example 3, and on the carbon-supported catalyst particles in Example 3. The STEM observation conditions were as follows. Dark-field STEM observation was carried out using a field emission transmission electron microscope (JEM-2100F with Cs corrector, manufactured by JEOL Ltd.) and at an acceleration voltage of 200 kV, both over a visual field of 25 nm×25 nm (magnification, 5,000,000×; FIG. 6A) and over a visual field of 12 nm×12 nm (magnification, 10,000,000×; FIG. 6B).

FIG. 6A is an electron micrograph of a $TiO_2$ particle just prior to the addition of SBH powder in Example 3. A lattice fringe distinctive to $TiO_2$ can be seen in the area surrounded by a border at the center of the image. The interplanar spacing is 2.89 Å, which value agrees with the lattice constant for the (101) plane of anatase-type $TiO_2$. FIG. 6B is an electron micrograph of a carbon-supported catalyst particle of Example 3. The area surrounded by the larger border at the center of the image represents a region occupied by $TiO_2$ and uncrystallized platinum, and the area surrounded by the smaller border represents a region occupied by crystallized platinum. As is apparent from FIG. 6B, no lattice fringe like that seen in FIG. 6A is apparent whatsoever in the region occupied by $TiO_2$ and uncrystallized platinum. This indicates that, in the carbon-supported catalyst particles of Example 3, reduction of the $TiO_2$ resulted in a collapse of the crystal structure of $TiO_2$, giving rise to oxygen defects.

In Example 3, XRD analysis was carried out on $TiO_2$ particles just prior to SBH powder addition, $TiO_2$ particles following SBH powder addition and just prior to firing, and on the carbon-supported catalyst particles in Example 3. The hardware and measurement conditions used in XRD analysis were as follows.

Hardware
Apparatus: XPert PRO MPD (from Spectorias)
Target: Cu (wavelength, 1.541 Å)
X-ray output: 45 kV, 40 mA
Monochromation ($CuK_\alpha$): Ni filter method
Optical system: focusing optics
Goniometer radius: 240 mm
Detector: semiconductor array detector Measurement Conditions
Scanning method: Continuous method
Scan axis: 2θ-θ (symmetric reflection)
Steps: 2θ=0.008356°
Average time/step: 29.845 seconds
Scan range: 2θ=4.0 to 90.0°
Fixed divergence slit: ½°

Figure 7A:
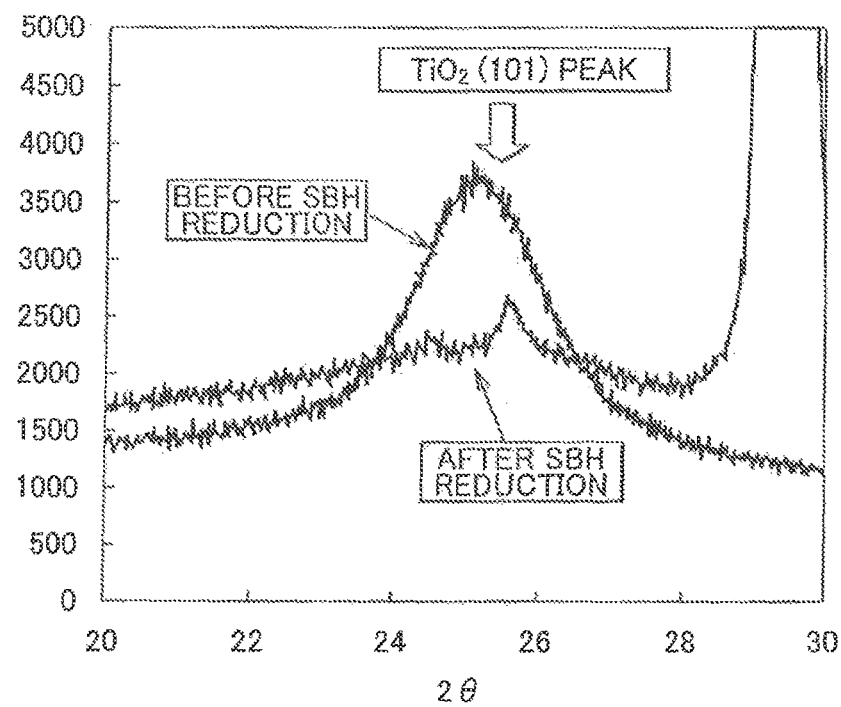
FIG. 7A shows the x-ray diffraction (XRD) spectra of $TiO_2$ particles in Example 3, just prior to the addition of SBH powder and just prior to firing following SBH powder addition.
Figure 7B:
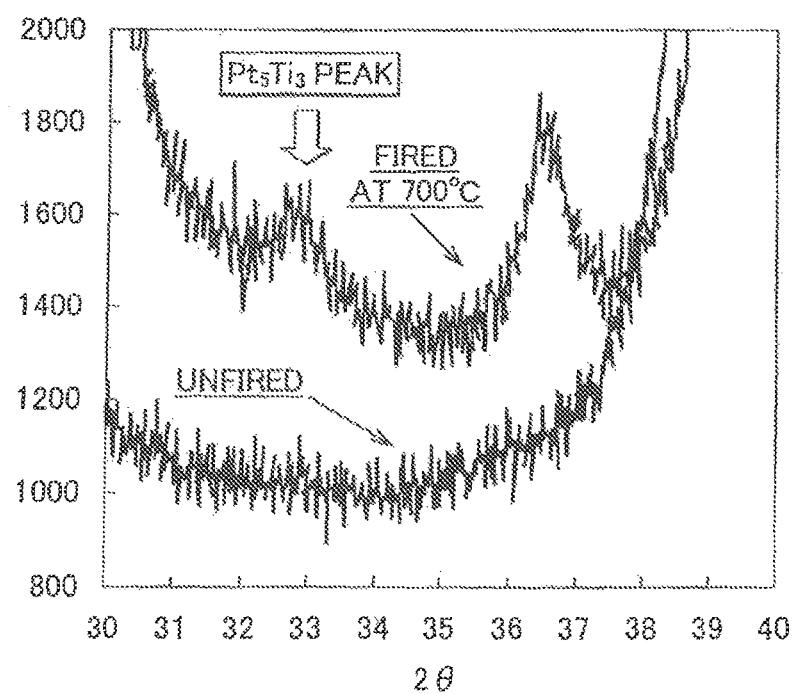
FIG. 7B shows the XRD spectra of $TiO_2$ particles just prior to firing in Example 3 and of the carbon-supported catalyst particles of Example 3.

FIG. 7A is a diagram in which part of an XRD spectrum for $TiO_2$ particles just prior to SBH powder addition is shown overlapped with part of an XRD spectrum for $TiO_2$ particles after SBH powder addition and just prior to firing. As is apparent from the diagram, a peak indicating diffraction by the (101) plane of $TiO_2$ near 2θ=25° appears prior to SBH reduction. However, after SBH reduction, the peak near 2θ=25° has substantially disappeared. This indicates that the crystallinity of $TiO_2$ has been strongly deteriorated due to SBH reduction. These results agree with the fact that, in the above-described STEM observations, a $TiO_2$ lattice fringe could not be observed in catalyst particles after the SBH powder has been added. FIG. 7B is a diagram in which part of the XRD spectrum for $TiO_2$ particles after SBH powder addition and just prior to firing is shown overlapped with part of the XRD spectrum for the carbon-supported catalyst particles of Example 3. As is apparent from the diagram, prior to firing, a peak is not observed within the range of 2θ=30 to 35°. However, in the catalyst particles after firing at 700° C., a peak indicating diffraction by $Pt_5Ti_3$ appears near 2θ=33°. It is apparent from this that Pt—Ti bonds have been formed by firing.

2-2. Analysis of Carbon-Supported Catalyst Particles of Example 4

Scanning electron microscopic (SEM) examination was carried out on the carbon-supported catalyst particles obtained in Example 4. The SEM examination conditions were as follows. Using a scanning electron microscope (S-5500, manufactured by Hitachi), SEM observations were carried out at an acceleration voltage of 30 kV and at magnifications of 800,000× (FIG. 8A), 600,000× (FIG. 8B) and 500,000× (FIG. 8C).

Figure 8A:
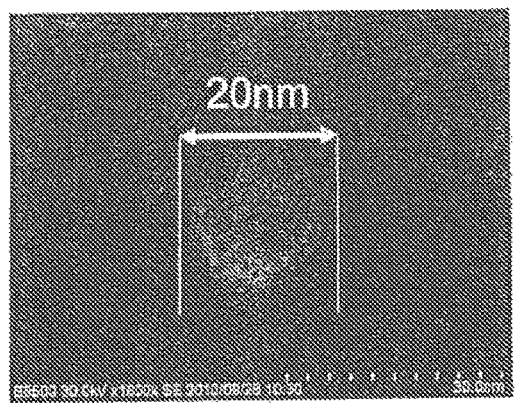
FIGS. 8A to 8C are electron micrographs of carbon-supported catalyst particles of Example 4.
Figure 8B:
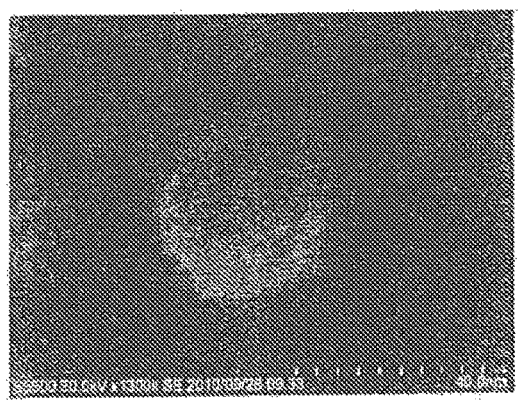
Figure 8C:

FIGS. 8A to 8C are electron micrographs of the carbon-supported catalyst particles of Example 4. The dark area at the center is the $SnO_2$ inner particle, and the relatively light outer area is the platinum outermost layer. In FIG. 8A, the white arrows indicate the diameter of the overall catalyst particle, and the black arrows indicate the thickness of the platinum outermost layer. As is apparent from FIGS. 8A to 8C, the diameter of the $SnO_2$ inner particle is about 20 nm, and the thickness of the platinum single-atom layer is 1 nm or less. It is also apparent from these SEM images that the platinum outermost layer is a continuous layer which entirely covers the SnO$_2$ inner particle. From these results, it is apparent that a platinum continuous layer can be made to cover the SnO$_2$ particle to a high coverage.

2-3. Carbon-Supported Catalysts of Examples 6 to 8

Particle Analysis: SEM examination was carried out on the carbon-supported catalyst particles obtained in Examples 6 to 8. The SEM examination conditions were as follows. Using a scanning electron microscope (S-5500, manufactured by Hitachi), SEM examination was carried out at an acceleration voltage of 30 kV and at magnifications of 1,800,000× (FIG. 9A), 2,000,000× (FIG. 9B), 1,000,000× (FIG. 10A) and 1,300,000× (FIG. 10B).

Figure 9A:
FIGS. 9A and 9B are electron micrographs of carbon-supported catalyst particles of Example 6.
Figure 9B:
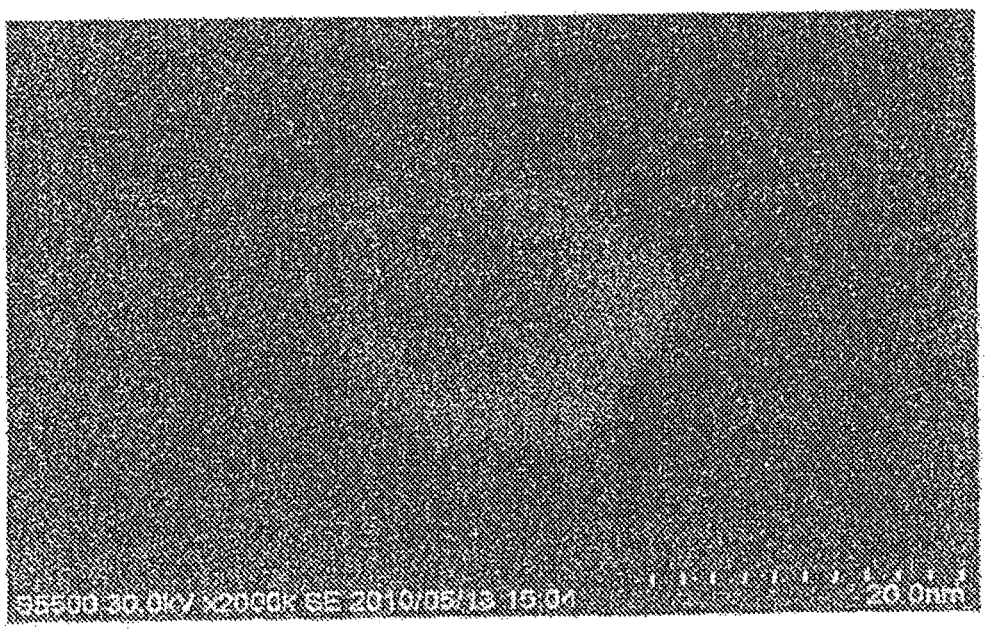
Figure 10A:
FIGS. 10A and 10B are electron micrographs of a carbon-supported catalyst particle of Example 7 and a carbon-supported catalyst particle of Example 8, respectively.
Figure 10B:

FIGS. 9A and 9B are electron micrographs of carbon-supported catalyst particles of Example 6. FIGS. 10A and 10B are electron micrographs of a carbon-supported catalyst particle of Example 7 (FIG. 10A) and a carbon-supported catalyst particle of Example 8 (FIG. 10B). The dark area at the center is the TiO$_2$ inner particle, and the relatively light outer area is the platinum outermost layer. As is apparent from FIGS. 9A and 9B, the size of the TiO$_2$ inner particle is about 16 nm, and the thickness of the platinum single-atom layer is about 0.25 nm. As is apparent from FIG. 10A, the TiO$_2$ inner particle has a diameter of about 23 nm, whereas the platinum three-atom layer has a thickness of about 1.0 nm. In addition, as is apparent from FIG. 10B, the TiO$_2$ inner particle has a diameter of about 27 nm, whereas the platinum 10-atom layer has a thickness of about 3 nm. It can be seen from these SEM images that the platinum outermost layer is a continuous layer which entirely covers the TiO$_2$ inner particle. From these results, it is evident that by selectively reducing the platinum using the photoreducing ability of TiO$_2$, the TiO$_2$ crystalline particle can be covered with a platinum continuous layer to a high coverage. In addition, it is evident that the thickness of the outermost layer can be controlled by means of the reducing conditions.

Figure 11A:
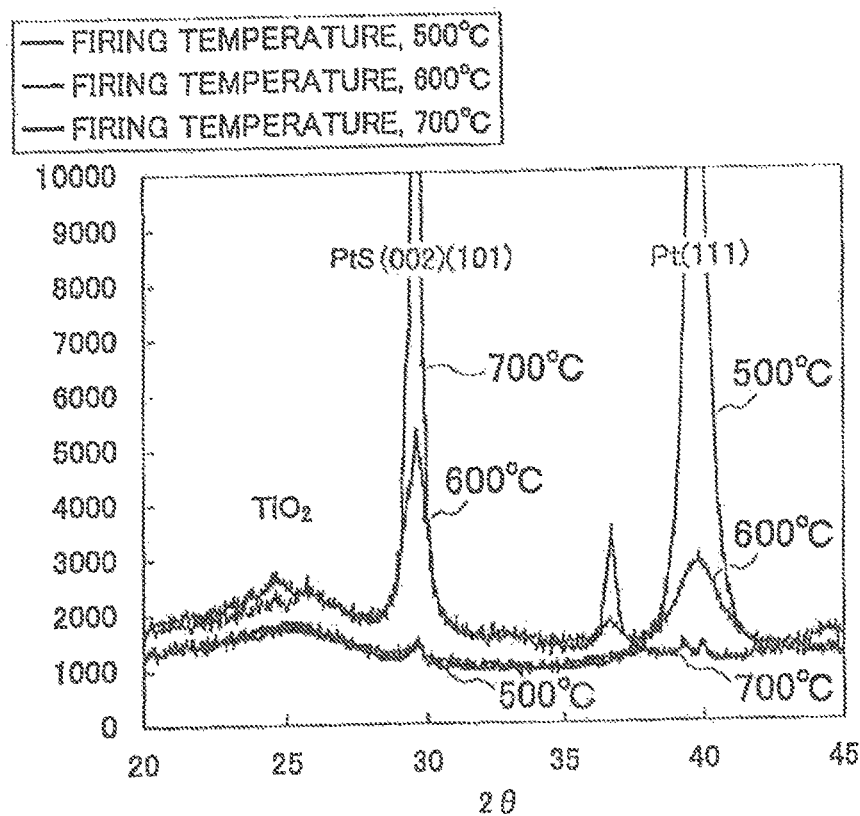
FIG. 11A is XRD spectra of catalyst particles on which firing was carried out at firing temperatures of 500° C., 600° C. and 700° C., based on the manufacturing method of Example 3.

3. Investigations of Catalyst Particle Activity and Durability 3-1. Potential Treatment of Catalyst Particles Before carrying out evaluation with a rotating disc electrode, the carbon-supported catalyst particles of Example 3 were subjected to potential treatment for the purpose of cleaning the platinum. FIG. 11A shows portions of the XRD spectra for catalyst particles on which, based on the manufacturing method in Example 3, firing was carried out at temperatures of, respectively, 500° C., 600° C. and 700° C. As is apparent from FIG. 11A, the 2θ=40° peak (the peak indicated as "Pt(111)") in the firing temperature 500° C. spectrum substantially disappears in the firing temperature 700° C. spectrum. On the other hand, it is apparent from FIG. 11A that the 2θ=30° peak (the peak indicated as "PtS(002)(101)") which is completely absent in the firing temperature 500° C. spectrum emerges at a strong intensity in the firing temperature 700° C. spectrum. These results show that by raising the firing temperature, some of the platinum becomes PtS, indicating that the platinum oxidizes. Therefore, it is evident that cleaning of the platinum is essential for carrying out correct electrochemical evaluation of the carbon-supported catalyst particles after high-temperature firing.

Figure 22:
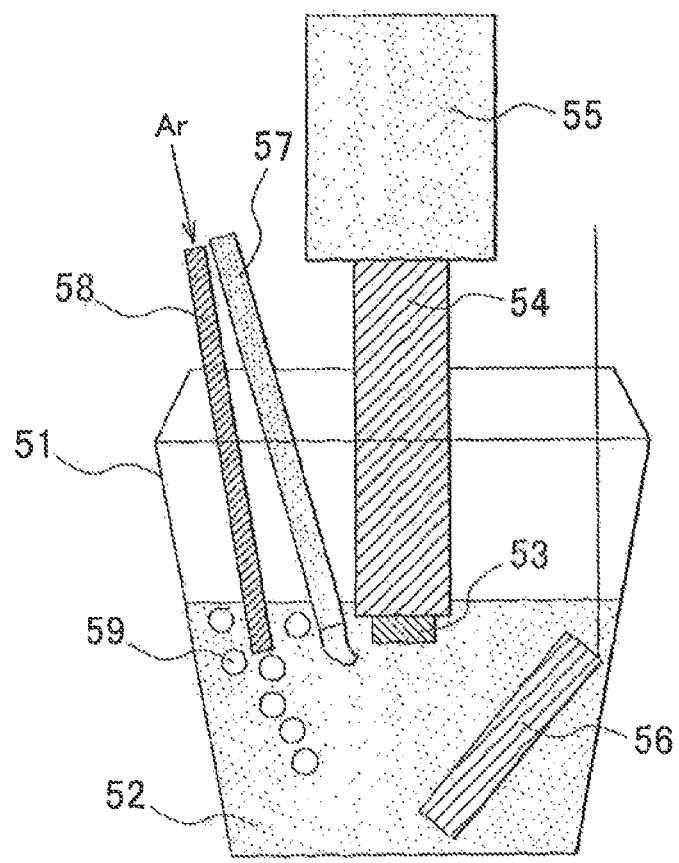
FIG. 22 is a perspective schematic view of an apparatus for carrying out potential treatment.

FIG. 22 is a perspective schematic view of the apparatus used to carry out potential treatment. An aqueous perchloric acid solution 52 was added to a glass cell 51, and a rotating disc electrode 54 coated with a slurry 53 of the carbon-supported catalyst particles of Example 3 was placed therein. The rotating disc electrode 54 is connected to a tachometer 55. In addition to the rotating disc electrode 54, a counterelectrode 56 and a reference electrode 57 are also arranged in the aqueous perchloric acid solution 52 so as to be fully immersed therein, and these three electrodes are electrically connected to a dual electrochemical analyzer. Also, an argon inlet tube 58 is disposed so as to be immersed in the aqueous perchloric acid solution 52 and argon is bubbled for a fixed period of time at room temperature into the aqueous perchloric acid solution 52 from an argon feed source (not shown) situated outside of the cell, thereby placing the interior of the aqueous perchloric acid solution 52 in an argon-saturated state. The circles 59 indicate bubbles of argon. Details on the apparatus are given below.

Aqueous perchloric acid solution: 0.1 mol/L HClO$_4$
Rotary disc electrode: An electrode made of glassy carbon
Tachometer: HR-201 (Hokuto Denko)
Counterelectrode: Platinum electrode (Hokuto Denko)
Reference electrode: Hydrogen electrode (KM Laboratory)
Dual electrochemical analyzer: ALS 700C (BAS Inc.)

Figure 11B:
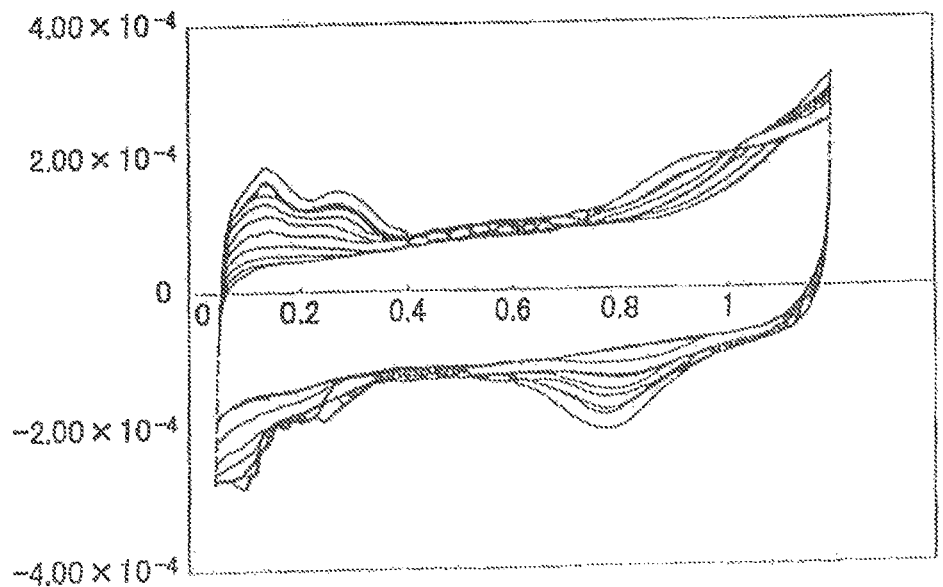
FIG. 11B is cyclic voltammograms (CVs) for the carbon-supported catalyst particles of FIG. 3.

Using the apparatus shown in FIG. 22, the potential was swept for 120 cycles over a potential sweep range of 0.05 to 1.2 V (vs. RHE) and at a potential sweep rate of 100 mV/s. FIG. 11B is a CV showing the potential treatment results. In FIG. 11B, the CVs on the outside have an increasingly larger number of cycles. As is apparent from FIG. 11B, the platinum peak becomes distinct as potential treatment is repeated. In addition, it was found that when the above potential treatment is extended even after platinum cleaning has been completed, the platinum outermost layer within the catalyst particles dissolves. The principle underlying this is the same as for thickness control of the platinum layer.

3-2. Carbon-Supported Catalyst of Example 3

Particle Evaluations (a) Calculation of ECSA

Figure 12A:
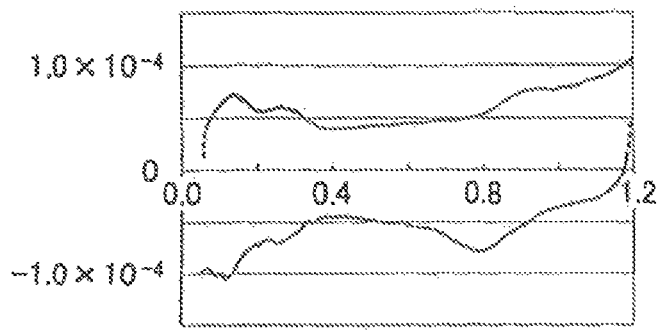
FIGS. 12A to 12C are cyclic voltammograms (CVs), sweep voltammogram for oxygen reduction, and the result of stability test in electrochemical active surface areas (ECSAs), respectively for the carbon-supported catalyst particles of Example 3.

The electrochemical surface area (ECSA) of the carbon-supported catalyst particles of Example 3 was calculated. Using the apparatus shown in FIG. 22, the potential was swept for 2 cycles over a potential sweep range of from 0.05 V to 1.2 V (vs. RHE) at a potential weep rate of 50 mV/s. The ECSA was calculated from the CV for the second cycle. FIG. 12A is the result obtained by the above-described CV. The ECSA calculated from this CV was 30 m$^2$/g-Pt. This value corresponds to the ECSA of platinum particles having a particle size of 6 nm.

(b) Measurement of Specific Activity and Mass Activity

Electrochemical measurements were carried out on the carbon-supported catalyst particles of Example 3, and the specific activity and mass activity, which are indicators of the oxygen reduction reaction (ORR) activity of the particles, were measured. The potential was swept for 2 cycles over a potential sweep range of 0.1 V to 1.05 V (vs. RHE) at a potential sweep rate of 10 mV/s while bubbling oxygen through the aqueous perchloric acid solution 52 within the glass cell 51 of the apparatus shown in FIG. 22. The kinetically controlled current (IK) was calculated from the current value at 0.9 V in the ORR curve for the second cycle. The value obtained by dividing this IK by the above-described ECSA was used as the specific activity, and the value obtained by dividing this IK by the mass of the platinum on the glassy carbon electrode was used as the mass activity.

Figure 12B:
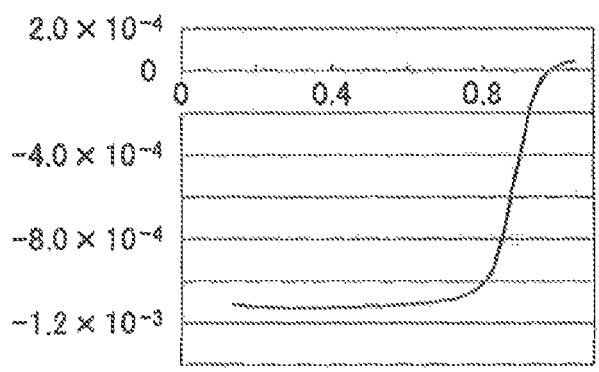

FIG. 12B is an electrochemical curve obtained from the above electrochemical measurements. The specific activity calculated from this electrochemical curve was 710 µA/cm$^2$-Pt. This value corresponds to 3.5 times the specific activity of platinum particles having a particles size of 4.5 nm, and to 4 times the specific activity of platinum particles having a particle size of 3 nm. The mass activity calculated from this electrochemical curve was 0.28 A/mg-Pt. This value corresponds to 2.3 times the mass activity of platinum particles having a particle size of 4.5 nm, and 1.7 times the mass activity of platinum particles having a particle size of 3 nm.

(c) Evaluation of Durability

Electrochemical measurement was carried out on the carbon-supported catalyst particles of Example 3, and the durability was evaluated. Conditions employed for the electrochemical measurement were explained in detail below. The catalyst particles were subjected to square-wave potential cycles from 0.65 to 1.0 V/5 sec over 5,000 cycles (vs. RHE) while bubbling oxygen through the aqueous perchloric acid solution 52 within the glass cell 51 of the apparatus shown in FIG. 22. After 5,000 cycles of sweeping, cyclic voltammetry was carried out in the same way as the method described above in the "(a) Calculation of ECSA" section, and the ECSA was calculated. Sweeping was then carried out once again under the same conditions over another 5,000 cycles (for a total of 10,000 cycles). After 10,000 cycles of sweeping, cyclic voltammetry was carried out in the same way as the method described above in the "(a) Calculation of ECSA" section, and the ECSA was calculated.

Figure 12C:
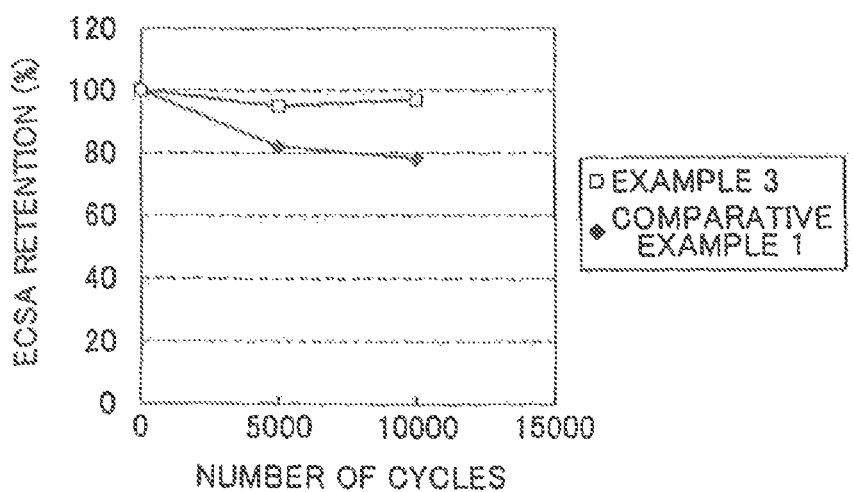

FIG. 12C is a graph of the durability evaluation results obtained from the above electrochemical measurements, with the ECSA retention (%) being plotted on the ordinate, and the number of cycles being plotted on the abscissa. Data for a catalyst obtained by supporting platinum particles having an average particle size of 3 nm (TEC10E50E, from Tanaka Kikinzoku Kogyo) on carbon is also plotted on the graph as Comparative Example 1. The graph shows the evaluation results for Example 3 plotted as white squares, and the evaluation results for Comparative Example 1 plotted as black diamonds. As is apparent from FIG. 12C, in Comparative Example 1, the ECSA retention after 5,000 cycles was 82%, and the ECSA retention after 10,000 cycles was 78%. By contrast, in Example 3 according to the invention, the ECSA retention after 5,000 cycles was 96%, and the ECSA retention after 10,000 cycles was 96%. Therefore, in Example 3, the durability of the carbon-supported catalyst particles was higher than the durability of the carbon-supported platinum particles in Comparative Example 1. Moreover, the ECSA after 10,000 cycles was substantially unchanged from the ECSA prior to use.

In addition, the carbon-supported catalyst particles of Example 3 and a catalyst (Comparative Example 2) obtained by supporting on carbon conventional catalyst particles composed of palladium particles coated with platinum were immersed for 12 hours in 2N $H_2SO_4$. As a result, palladium dissolving from the catalyst of Comparative Example 2 was 80%, whereas titanium dissolving from the carbon-supported catalyst particles of Example 3 was 0%. It is apparent from these results that the $TiO_2$ forming the inner particle undergoes no dissolving whatsoever.

It is apparent from the above that the carbon-supported catalyst particles of Example 3 have an ECSA equivalent to that of platinum particles having a particle size of 6 nm and that, even after 10,000 cycles, this ECSA remains substantially unchanged from that prior to use. Moreover, it is apparent that the carbon-supported catalyst particles of Example 3 have a specific activity about 4 times greater, and a mass activity about 2 times greater, than those of platinum particles which have hitherto been used. It is thus evident that the carbon-supported catalyst particles of the embodiments have a higher catalyst activity and a better durability than the carbon-supported platinum particles which have hitherto been used as electrode catalysts.

3-3. Evaluations of Carbon-Supported Catalyst Particles of Example 6

(a) Calculation of Surface Area Per Unit Mass of Platinum

Figure 13A:
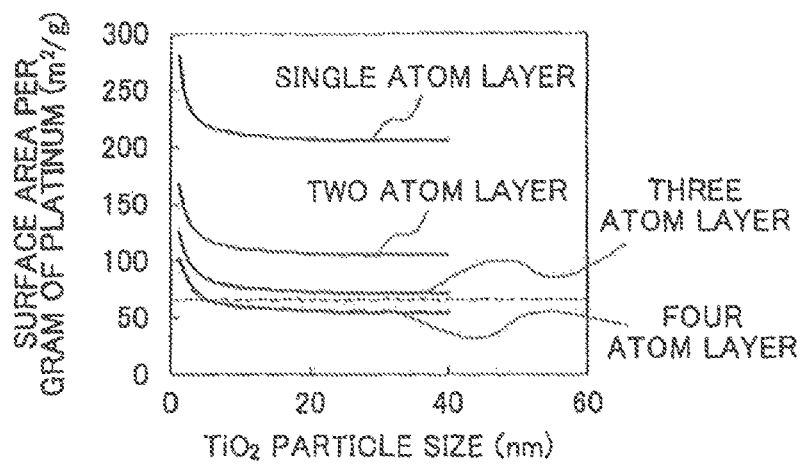
FIG. 13A is graph of the surface area per unit mass of platinum for various platinum coating layer thicknesses in the carbon-supported catalyst particles of Example 6 where the titanium oxide was covered with platinum.

Calculations were carried out on the carbon-supported catalyst particles of Example 6, which are $TiO_2$ particles covered with platinum, for cases in which the coating platinum is a single-atom layer, a two-atom layer, a three-atom layer and a four-atom layer, and the surface area per unit mass of platinum in each case was determined. FIG. 13A is a graph which collectively presents these calculated results, the surface area ($m^2/g$) per gram of platinum being plotted on the ordinate and the particle size (nm) of the $TiO_2$ particles which are the inner particles being plotted on the abscissa. The dashed line in the graph indicates the surface area (62 $m^2/g$) per gram of platinum in conventional platinum-supported carbon (average particle size, 4.5 nm). It is apparent from FIG. 13A that, as the particle size of the inner particle becomes larger, the surface area per unit mass of platinum decreases. Taking note of the fact that the calculated results are largest at a $TiO_2$ particle size of 40 nm, the surface area per unit mass of platinum exceeds 200 $m^2/g$ in the case of a platinum single-atom layer, exceeds 100 $m^2/g$ in the case of a platinum two-atom layer, and exceeds 60 $m^2/g$ in the case of a platinum three-atom layer. Each of these values is higher than the surface area per unit mass of platinum for conventional platinum-supported carbon. However, in the case of a platinum four-atom layer, when the particle size of the inner particle exceeds 10 nm, the surface area per unit mass of the platinum becomes smaller than in conventional platinum-supported carbon. From the above, by having the platinum-containing outermost layer be a layer of three or fewer atoms, the surface area per unit mass of platinum can be made larger than in conventional platinum-supported carbon.

(b) Relationship between Platinum Particle Size and ECSA Retention

Figure 13B:
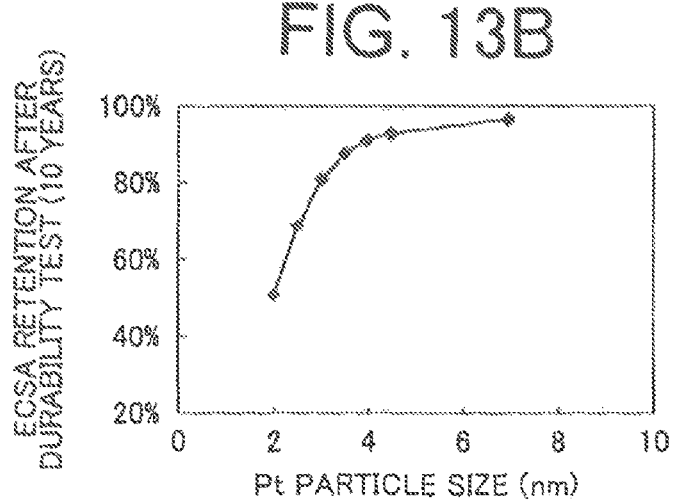
FIG. 13B reveals the dependence of ECSA retention on Pt particle size.

FIG. 13B shows the simulation results for the correlation between catalyst particle size and ECSA retention. This is a graph in which the ECSA retention (%) after the durability test period is plotted on the ordinate, and the particle size (nm) is plotted on the abscissa. The durability test period was set to 10 years. The amount of catalyst was calculated as including 0.1 mg of platinum per $cm^2$ of the membrane electrode assembly. From the diagram, it is apparent that as the catalyst particle size becomes larger, the ECSA retention rises. However, the rate of increase in ECSA retention becomes smaller as the catalyst particle size increases.

(c) Relationship Between Platinum Particle Size and Specific Activity

Figure 13C:
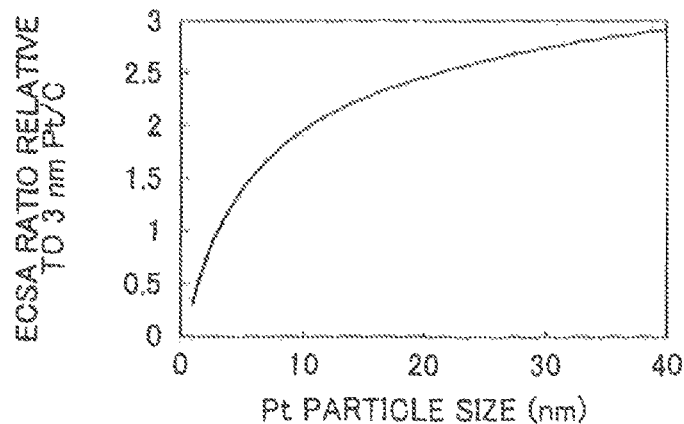
FIG. 13C shows the relationships between ECSA ratio and particle size of catalyst.

FIG. 13C is a graph showing the ratio of the ECSA of platinum catalyst particles having a specific particle size relation to the ECSA of platinum catalyst particles having a particle size of 3 nm. This graph plots the ratio on the ordinate, and plots the platinum catalyst particles size (nm) on the abscissa. From the graph, it is apparent that as the catalyst particle size becomes larger, the ECSA ratio rises. Therefore, theoretically, catalyst particles having a high activity can be obtained as the catalyst particle size becomes larger. However, in the case of platinum catalyst particles, as the particle size becomes larger, the activity per unit cost becomes lower. In the case of catalyst particles having an inner particle composed of an oxide as in the invention disclosed herein, because there are no particle size constraints due to cost, an increased activity can be achieved by increasing the particles size as much as possible.

The invention claimed is:

1. A method of manufacturing catalyst particles having an inner particle and a continuous outermost layer that contains platinum and that covers the inner particle, the method comprising:

preparing a dispersion of particles composed of a second oxide that is free of oxygen defects;

preparing a dispersion of platinum ions;

mixing together the dispersion of particles composed of the second oxide and the dispersion of platinum ions, and reducing at least surfaces of the particles composed of the second oxide to a first oxide having oxygen defects, and moreover forming on the first oxide the continuous outermost layer containing platinum formed by reduction of the platinum ions; and heating the mixture after forming the continuous outermost layer on the first oxide, wherein the dispersion of particles composed of the second oxide is a dispersion of reversed micelles containing particles composed of the second oxide;

the dispersion of platinum ions is a dispersion of reversed micelles containing platinum ions;

a first reducing agent is additionally mixed into mixture of the dispersion of reversed micelles containing particles composed of the second oxide with the dispersion of reversed micelles containing platinum ions;

the mixture is heated after adding an alcohol to the mixture following formation of the continuous outermost layer on the first oxide, and before the first reducing agent is additionally mixed into mixture of the dispersion of reversed micelles containing particles composed of the second oxide with the dispersion of reversed micelles containing platinum ions, the dispersion of particles composed of the second oxide and the dispersion of platinum ions are mixed.

2. The manufacturing method according to claim 1, wherein the dispersion of reversed micelles containing particles composed of the second oxide is obtained by mixing an aqueous solution or aqueous dispersion of particles composed of the second oxide with an organic solvent solution of a surfactant.

3. The manufacturing method according to claim 2, wherein the dispersion of reversed micelles containing platinum ions is obtained by mixing an aqueous solution of the platinum ions with an organic solvent solution of a surfactant.

4. The manufacturing method according to claim 1, wherein the second oxide is an oxide selected from the group consisting of titanium (IV) oxide, tin (IV) oxide, tantalum (V) oxide, niobium (V) oxide and silicon dioxide.

5. A method of manufacturing carbon-supported catalyst particles composed of catalyst particles that are obtained by the manufacturing method according to claim 1 and that have been supported on a carbon support, the method comprising:

when a second reducing agent is to be used to pre-reduce particles composed of at least the second oxide, admixing the carbon support either before additionally mixing the first reducing agent into the mixture of the dispersion of reversed micelles containing particles composed of the second oxide with the dispersion of reversed micelles containing platinum ion or after additionally mixing the first reducing agent into the mixture.

6. The method of manufacturing carbon-supported catalyst particles according to claim 5, wherein the carbon support is a support composed of at least one carbon material selected from the group consisting of acetylene black, furnace black, carbon black, activated carbon, mesophase carbon and graphite.

* * * * *